US 8,250,829 B2

(12) United States Patent
McPheeters et al.

(10) Patent No.: US 8,250,829 B2
(45) Date of Patent: Aug. 28, 2012

(54) MODULE ATTACHMENT APPARATUS

(75) Inventors: Greg McPheeters, Santa Clara, CA (US); Chris Oestreich, Pismo Beach, CA (US); Ethan Miller, Los Osos, CA (US)

(73) Assignee: Mainstream Energy Corporation, San Luis Obispo, CA (US)

( * ) Notice: Subject to any disclaimer, the term of this patent is extended or adjusted under 35 U.S.C. 154(b) by 176 days.

(21) Appl. No.: 12/470,697

(22) Filed: May 22, 2009

(65) Prior Publication Data
US 2010/0281793 A1 Nov. 11, 2010

Related U.S. Application Data

(60) Provisional application No. 61/071,891, filed on May 22, 2008.

(51) Int. Cl.
*E04B 1/38* (2006.01)
*E04D 13/18* (2006.01)
*F16B 27/00* (2006.01)

(52) U.S. Cl. .......... 52/710; 52/173.3; 52/711; 403/257; 403/259; 403/21; 411/84; 136/244; 136/251

(58) Field of Classification Search ................. 52/173.3, 52/710, 845, 846, 711; 411/84; 248/58, 248/62, 72; 403/256, 257, 259, 21, 22
See application file for complete search history.

(56) References Cited

U.S. PATENT DOCUMENTS

| 276,135 A | 4/1883 | Cooley |
| 741,747 A | 10/1903 | Walz |
| 1,316,084 A | 9/1919 | Dake |
| 1,568,122 A | 1/1926 | Zifferer ...................... 248/228.2 |
| 1,608,592 A * | 11/1926 | Funk .............................. 446/126 |
| 1,616,232 A | 2/1927 | Roberts et al. |
| 1,724,394 A | 8/1929 | Chamberlain |
| 2,182,480 A | 12/1939 | Lowry |
| 2,253,241 A | 8/1941 | MacDonald |
| 2,345,650 A * | 4/1944 | Attwood ......................... 403/21 |
| 2,380,379 A * | 7/1945 | Attwood .................... 248/163.1 |
| 2,429,833 A | 10/1947 | Luce |
| 2,676,680 A * | 4/1954 | Kindorf .......................... 403/22 |
| 2,696,139 A * | 12/1954 | Attwood ....................... 411/427 |
| 2,741,289 A | 4/1956 | Grow |
| 2,833,326 A | 5/1958 | Karl |
| 2,928,512 A * | 3/1960 | Slater et al. ..................... 403/22 |
| 2,944,642 A * | 7/1960 | Evans .............................. 403/22 |
| 3,019,887 A | 2/1962 | Lowden |
| 3,043,408 A * | 7/1962 | Attwood ......................... 52/842 |
| 3,056,443 A | 10/1962 | Knocke |
| 3,059,589 A | 10/1962 | Schreyer |
| 3,124,330 A | 3/1964 | Robinson |
| 3,306,562 A | 2/1967 | Bellefleur |
| 3,408,780 A | 11/1968 | Brister .............................. 52/58 |
| 3,425,473 A | 2/1969 | Knowlton |

(Continued)

*Primary Examiner* — Robert Canfield
(74) *Attorney, Agent, or Firm* — Kramer Levin Naftalis & Frankel LLP

(57) ABSTRACT

Exemplary systems and methods described herein can be used to secure a rail to a module or the rail to a support using a nut that can be inserted at a desired point of mounting. Another exemplary system describes a flashing to be inserted under a roof shingle, wherein the flashing is secured to a support for a rail or module. Yet another exemplary system describes a clamp that secures a rail or module and is adjustable along the length of a post. Spacers can be added to the post to extend the adjustment range of the clamp.

11 Claims, 25 Drawing Sheets

U.S. PATENT DOCUMENTS

| | | | | |
|---|---|---|---|---|
| 3,434,748 A * | 3/1969 | Leurent | | 403/257 |
| 3,458,052 A * | 7/1969 | Kann | | 211/193 |
| 3,483,910 A * | 12/1969 | Van Huffel et al. | | 411/112 |
| 3,493,025 A * | 2/1970 | Van Huffel et al. | | 411/103 |
| 3,612,585 A * | 10/1971 | Mayr | | 403/264 |
| 3,778,175 A * | 12/1973 | Zimmer | | 403/187 |
| 3,966,342 A * | 6/1976 | Moriya | | 403/256 |
| 4,049,253 A | 9/1977 | Mandel | | |
| 4,073,113 A * | 2/1978 | Oudot et al. | | 52/710 |
| 4,429,440 A * | 2/1984 | Laughlin et al. | | 24/486 |
| 4,533,277 A | 8/1985 | Alexander et al. | | |
| 4,569,530 A | 2/1986 | Cross | | |
| 4,575,295 A * | 3/1986 | Rebentisch | | 411/85 |
| 4,586,301 A * | 5/1986 | Hickman | | 52/96 |
| 4,764,340 A | 8/1988 | Lui et al. | | |
| 4,783,040 A * | 11/1988 | Lindberg et al. | | 248/74.3 |
| 4,813,833 A | 3/1989 | Haab | | |
| 4,830,531 A * | 5/1989 | Condit et al. | | 403/348 |
| 4,838,412 A * | 6/1989 | Backman | | 198/838 |
| 4,917,553 A * | 4/1990 | Muller | | 411/85 |
| 4,950,099 A * | 8/1990 | Roellin | | 403/348 |
| 4,957,402 A * | 9/1990 | Klein et al. | | 411/84 |
| 5,079,791 A | 1/1992 | Grech | | |
| 5,087,879 A | 2/1992 | Sugifune et al. | | |
| 5,116,161 A * | 5/1992 | Faisst | | 403/231 |
| 5,118,233 A * | 6/1992 | Mitchell | | 411/5 |
| 5,209,620 A | 5/1993 | Zare-Ardestani | | |
| 5,259,165 A | 11/1993 | Koyama | | |
| 5,269,784 A | 12/1993 | Mast | | |
| 5,271,586 A * | 12/1993 | Schmidt | | 248/58 |
| 5,316,244 A * | 5/1994 | Zetena, Jr. | | 248/49 |
| 5,329,694 A | 7/1994 | Sickels et al. | | |
| 5,340,251 A | 8/1994 | Takahashi et al. | | |
| 5,345,737 A * | 9/1994 | Latchinian | | 52/280 |
| 5,351,926 A * | 10/1994 | Moses | | 248/354.5 |
| 5,352,078 A | 10/1994 | Nasu | | |
| 5,413,437 A | 5/1995 | Bristow | | |
| 5,433,053 A | 7/1995 | Tulloch | | |
| D363,997 S * | 11/1995 | Nomura | | D25/122 |
| 5,464,232 A | 11/1995 | Chizmadia | | |
| 5,481,842 A * | 1/1996 | Gautreau | | 52/656.9 |
| 5,520,292 A * | 5/1996 | Lombardi | | 211/85.6 |
| 5,531,552 A | 7/1996 | Takahashi et al. | | |
| D378,047 S * | 2/1997 | Chudoba | | D8/354 |
| 5,636,426 A | 6/1997 | Luckhardt et al. | | |
| 5,713,116 A | 2/1998 | Nickerson et al. | | |
| 5,762,720 A * | 6/1998 | Hanoka et al. | | 136/251 |
| 5,797,573 A | 8/1998 | Nasu | | |
| 5,797,581 A | 8/1998 | Sherman | | |
| 5,800,436 A | 9/1998 | Lerch | | |
| 5,875,600 A * | 3/1999 | Redman | | 52/656.4 |
| 5,946,797 A | 9/1999 | Kawabe et al. | | |
| 5,988,930 A | 11/1999 | Liebetrau et al. | | |
| 5,991,998 A | 11/1999 | Kaneko | | |
| 6,086,300 A * | 7/2000 | Frohlich | | 411/84 |
| 6,216,997 B1 | 4/2001 | Short | | |
| 6,220,804 B1 | 4/2001 | Pamer et al. | | |
| 6,249,954 B1 | 6/2001 | Kawabe et al. | | |
| 6,290,426 B1 * | 9/2001 | van Gijsel et al. | | 403/374.3 |
| 6,360,491 B1 | 3/2002 | Ullman | | 52/22 |
| 6,364,262 B1 | 4/2002 | Gibson et al. | | |
| 6,435,781 B1 | 8/2002 | Jones | | |
| 6,450,475 B1 | 9/2002 | Tsai et al. | | |
| 6,488,458 B2 | 12/2002 | Ninomiya et al. | | |
| 6,526,701 B2 | 3/2003 | Stearns et al. | | 52/24 |
| 6,571,407 B1 | 6/2003 | Skarie | | |
| 6,591,475 B2 | 7/2003 | Ninomiya et al. | | |
| 6,609,288 B2 | 8/2003 | Ninomiya et al. | | |
| 6,612,642 B2 | 9/2003 | Kasahara | | |
| 6,672,018 B2 * | 1/2004 | Shingleton | | 52/173.3 |
| 6,679,640 B2 | 1/2004 | Smith | | |
| 6,712,540 B2 * | 3/2004 | Schmalzhofer et al. | | 403/248 |
| 6,712,543 B1 * | 3/2004 | Schmalzhofer | | 403/381 |
| 6,712,568 B2 * | 3/2004 | Snyder et al. | | 410/104 |
| 6,719,481 B2 * | 4/2004 | Hoffmann | | 403/403 |
| 6,739,038 B2 | 5/2004 | Herold | | |
| 6,745,443 B2 | 6/2004 | Matsumoto et al. | | |
| 6,751,851 B2 | 6/2004 | Ninomiya et al. | | |
| 6,751,854 B2 | 6/2004 | Takiyama | | |
| 6,751,914 B2 * | 6/2004 | Zeh et al. | | 52/239 |
| 6,757,953 B2 | 7/2004 | Matsumoto et al. | | |
| 6,758,014 B2 * | 7/2004 | Chen | | 52/63 |
| 6,804,871 B1 | 10/2004 | Smith | | |
| 6,807,791 B2 * | 10/2004 | Herb | | 52/846 |
| 6,827,531 B2 * | 12/2004 | Womack et al. | | 410/104 |
| 6,846,140 B2 * | 1/2005 | Anderson et al. | | 410/104 |
| 6,872,038 B2 * | 3/2005 | Westlake | | 411/85 |
| 6,877,199 B2 | 4/2005 | Cassese et al. | | |
| 6,910,609 B2 * | 6/2005 | Williams et al. | | 224/519 |
| 6,962,591 B2 | 11/2005 | Lerch | | |
| 7,004,667 B2 * | 2/2006 | Ludwig et al. | | 403/258 |
| 7,111,909 B2 | 9/2006 | Andersen | | |
| 7,124,492 B2 | 10/2006 | Wojciechowski et al. | | |
| 7,178,880 B2 | 2/2007 | Andersen | | |
| 7,246,547 B2 * | 7/2007 | Van Walraven | | 81/461 |
| 7,249,624 B2 * | 7/2007 | Zeh et al. | | 160/371 |
| 7,260,918 B2 * | 8/2007 | Liebendorfer | | 52/173.3 |
| 7,275,903 B2 | 10/2007 | Schultz | | |
| 7,281,889 B2 * | 10/2007 | Anderson et al. | | 410/104 |
| 7,338,245 B2 * | 3/2008 | Ladouceur | | 411/427 |
| 7,341,413 B2 | 3/2008 | Morris et al. | | |
| 7,386,922 B1 | 6/2008 | Taylor et al. | | |
| 7,389,621 B2 * | 6/2008 | Hawes | | 52/655.1 |
| 7,434,362 B2 * | 10/2008 | Liebendorfer | | 52/173.3 |
| 7,434,364 B2 | 10/2008 | MacDermott et al. | | |
| 7,475,466 B2 | 1/2009 | Marume et al. | | |
| 7,594,787 B2 * | 9/2009 | Womack et al. | | 410/104 |
| 7,600,349 B2 * | 10/2009 | Liebendorfer | | 52/173.3 |
| 7,604,429 B2 * | 10/2009 | Prange | | 403/403 |
| 7,604,444 B2 * | 10/2009 | Wu | | 411/85 |
| 7,621,487 B2 * | 11/2009 | Brown et al. | | 248/65 |
| 7,634,875 B2 * | 12/2009 | Genschorek | | 52/173.3 |
| 7,650,716 B1 * | 1/2010 | Schemeley | | 47/23.1 |
| 7,748,175 B2 * | 7/2010 | Liebendorfer | | 52/173.3 |
| 7,766,292 B2 * | 8/2010 | Liebendorfer | | 248/237 |
| 7,780,472 B2 | 8/2010 | Lenox | | |
| 7,797,883 B2 | 9/2010 | Tarbell et al. | | 52/27 |
| 7,797,906 B2 * | 9/2010 | Kassem | | 52/713 |
| D627,717 S * | 11/2010 | Munoz et al. | | D13/102 |
| 7,849,576 B2 | 12/2010 | Sawada et al. | | |
| 7,861,485 B1 | 1/2011 | Wentworth et al. | | 52/745.06 |
| 7,874,774 B2 * | 1/2011 | Peterson | | 410/104 |
| 7,921,607 B2 | 4/2011 | Thompson et al. | | 52/60 |
| 7,971,398 B2 | 7/2011 | Tweedie | | 52/173.3 |
| 2002/0046506 A1 | 4/2002 | Ullman | | 52/1 |
| 2002/0066235 A1 | 6/2002 | Stearns et al. | | 52/24 |
| 2003/0015637 A1 * | 1/2003 | Liebendorfer | | 248/237 |
| 2003/0049094 A1 * | 3/2003 | Westlake | | 411/84 |
| 2003/0101662 A1 | 6/2003 | Ullman | | 52/27 |
| 2003/0177706 A1 | 9/2003 | Ullman | | 52/3 |
| 2003/0198530 A1 * | 10/2003 | Hoffmann et al. | | 411/84 |
| 2003/0206785 A1 * | 11/2003 | Hoffmann et al. | | 411/84 |
| 2004/0163338 A1 * | 8/2004 | Liebendorfer | | 52/173.1 |
| 2004/0165965 A1 * | 8/2004 | Unverzagt et al. | | 411/84 |
| 2005/0226683 A1 * | 10/2005 | Herb | | 403/230 |
| 2006/0156648 A1 | 7/2006 | Thompson et al. | | 52/173.3 |
| 2008/0010915 A1 * | 1/2008 | Liebendorfer | | 52/173.3 |
| 2008/0121273 A1 | 5/2008 | Plaisted et al. | | 136/251 |
| 2010/0041486 A1 | 2/2010 | Selle | | |
| 2010/0088996 A1 | 4/2010 | Thompson et al. | | 52/704 |
| 2010/0170163 A1 | 7/2010 | Tarbell et al. | | 52/27 |
| 2010/0192505 A1 | 8/2010 | Schaefer et al. | | 52/653.2 |
| 2010/0263297 A1 * | 10/2010 | Liebendorfer | | 52/11 |
| 2010/0276558 A1 * | 11/2010 | Faust et al. | | 248/222.14 |
| 2011/0036028 A1 | 2/2011 | Beck | | |
| 2011/0120047 A1 | 5/2011 | Stearns et al. | | 52/698 |

* cited by examiner

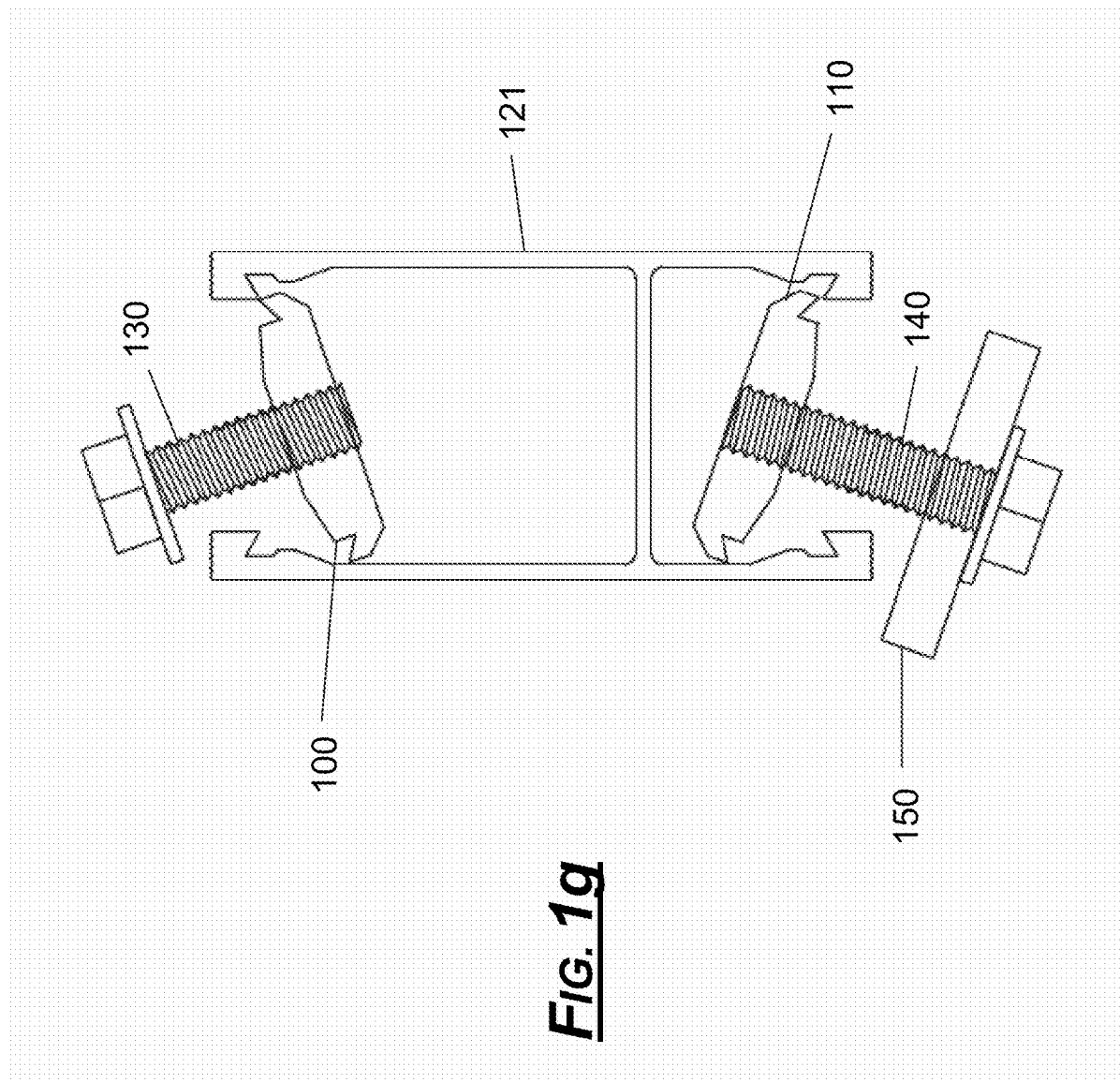

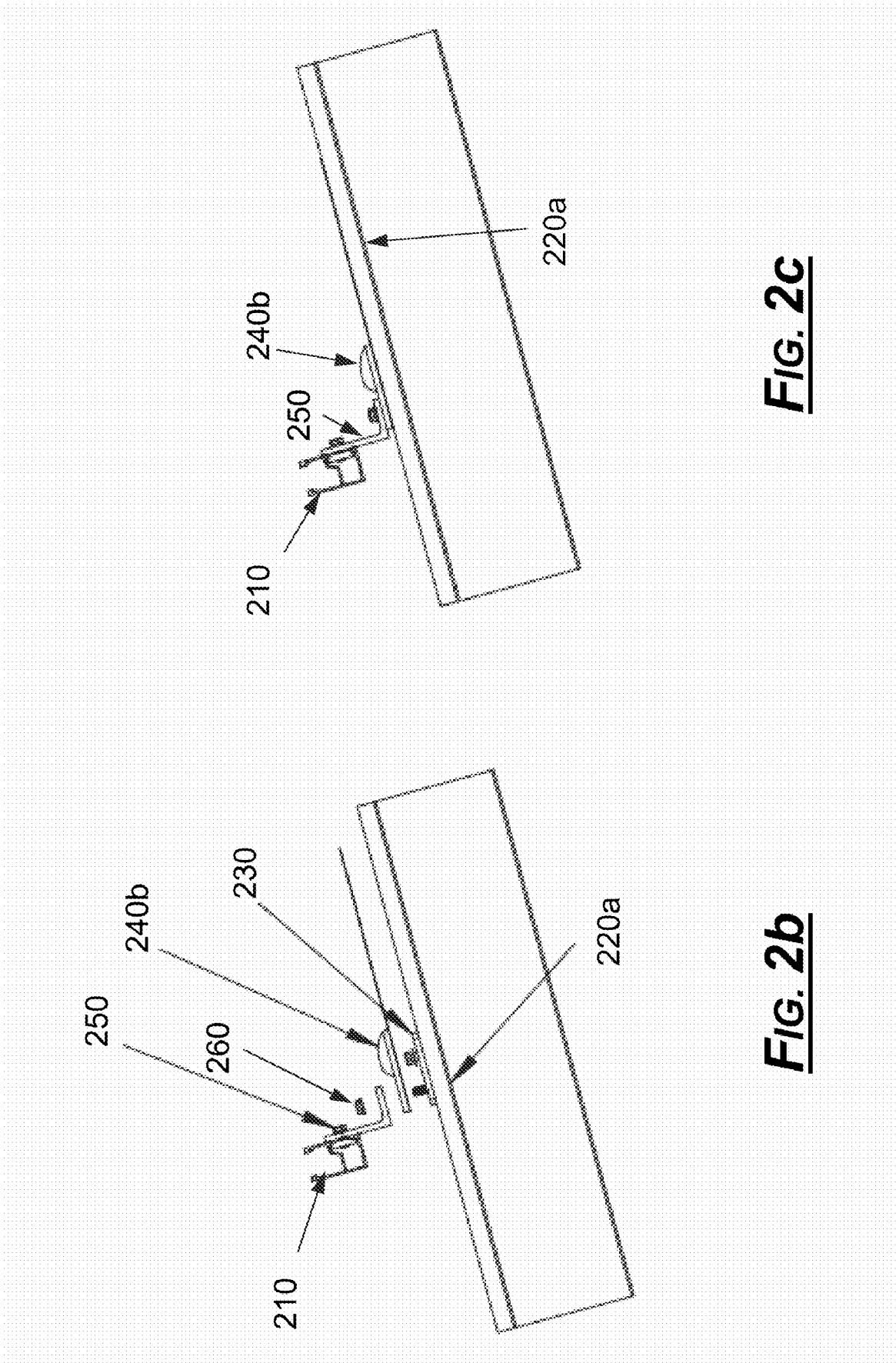

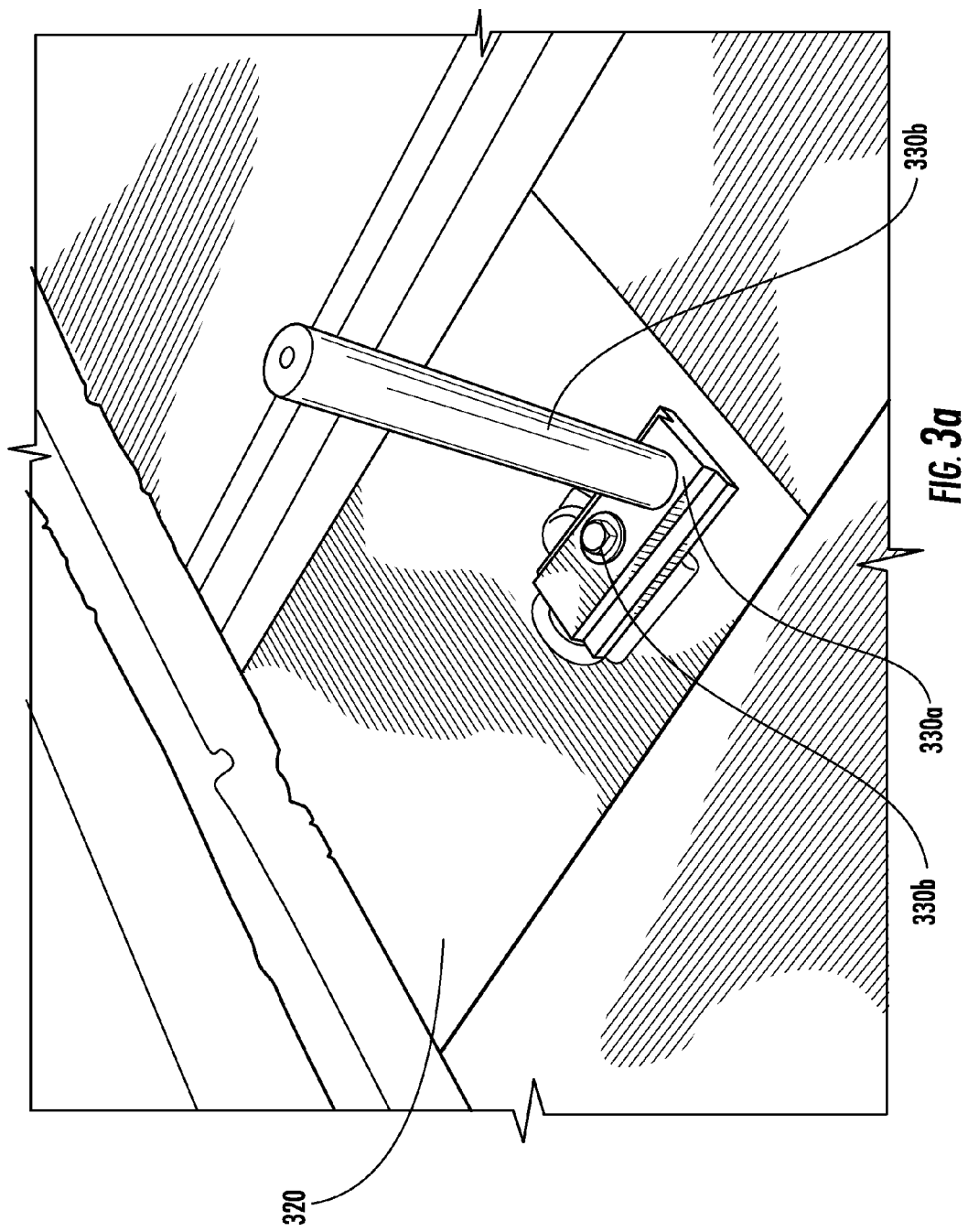

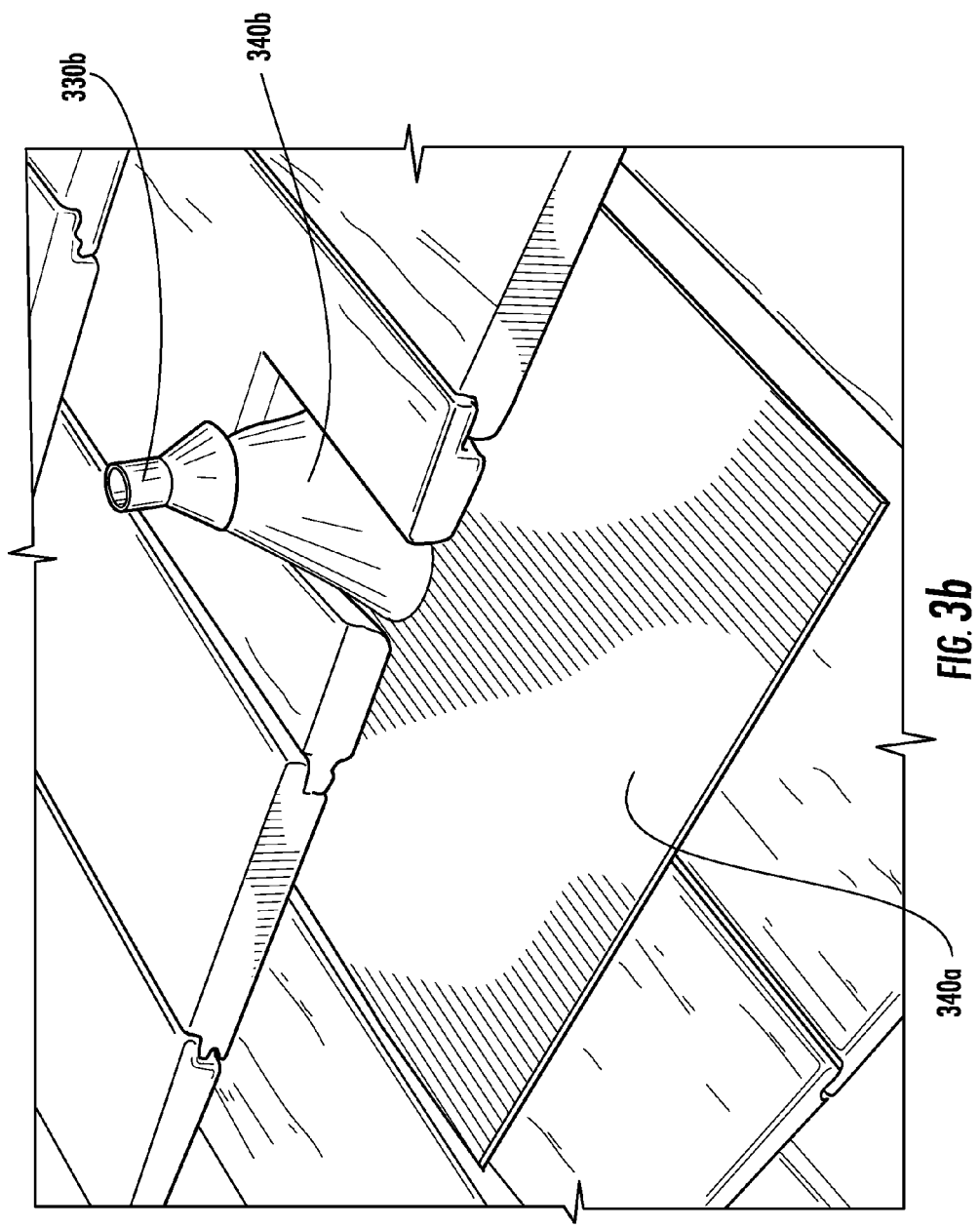

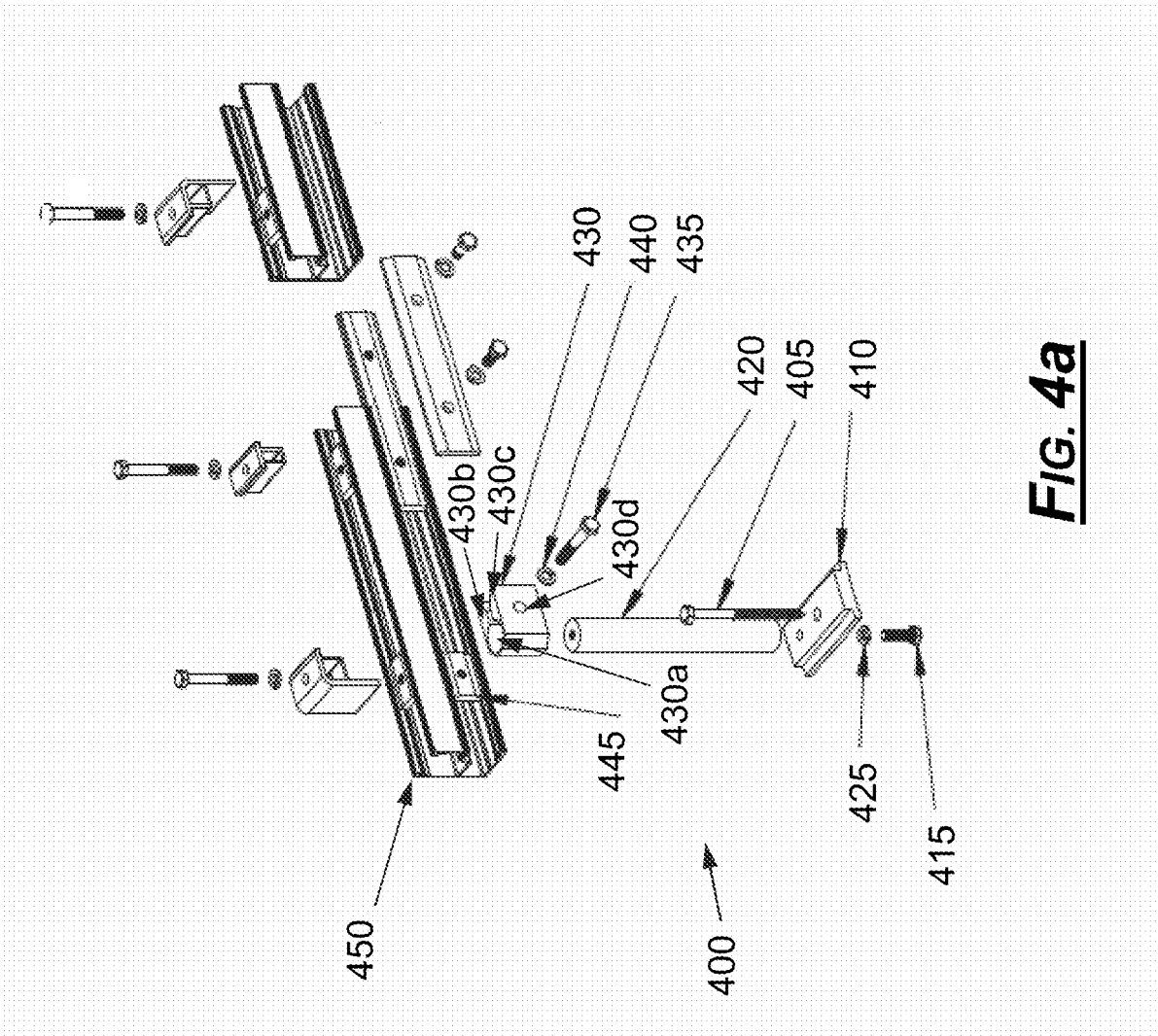

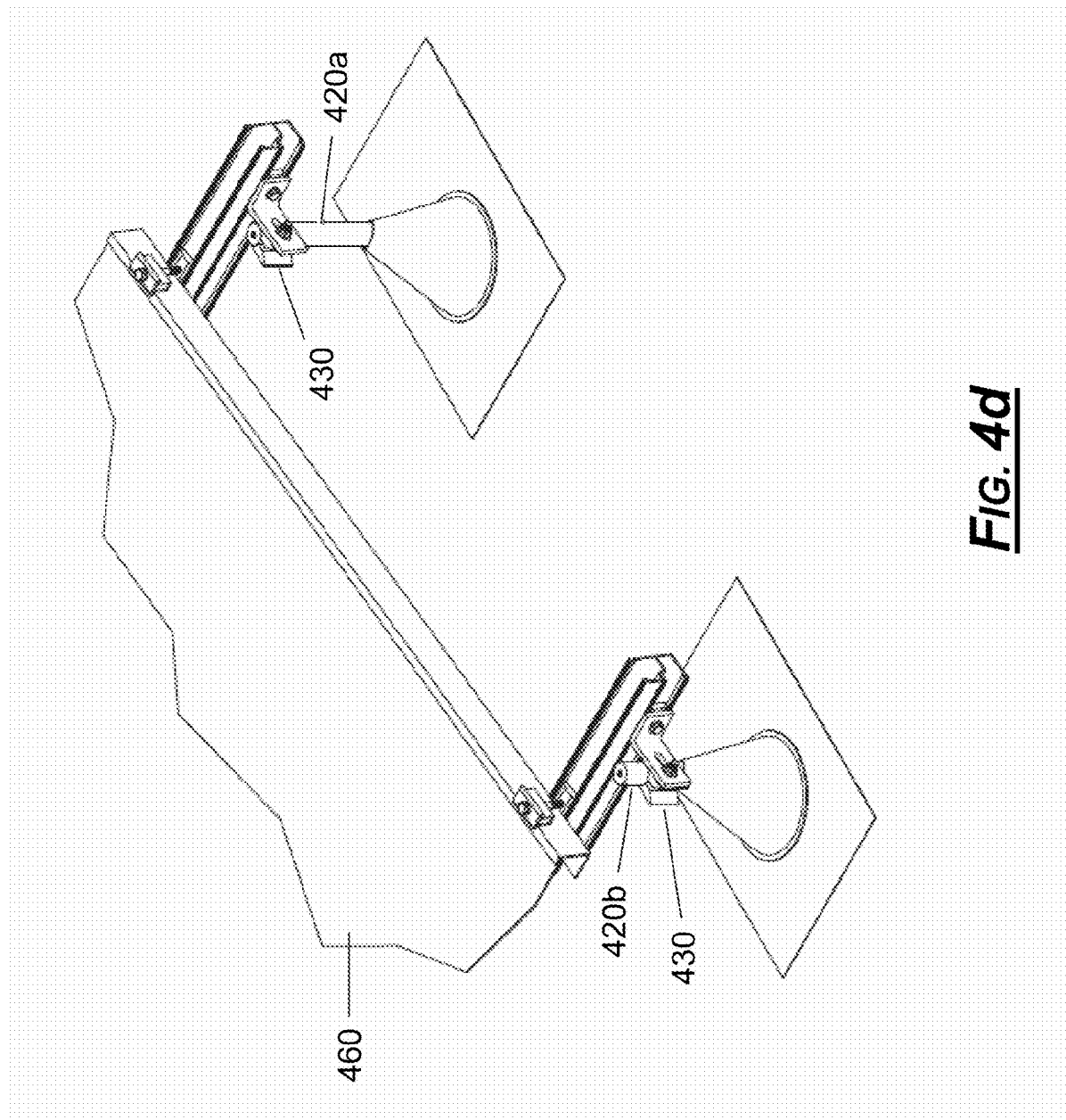

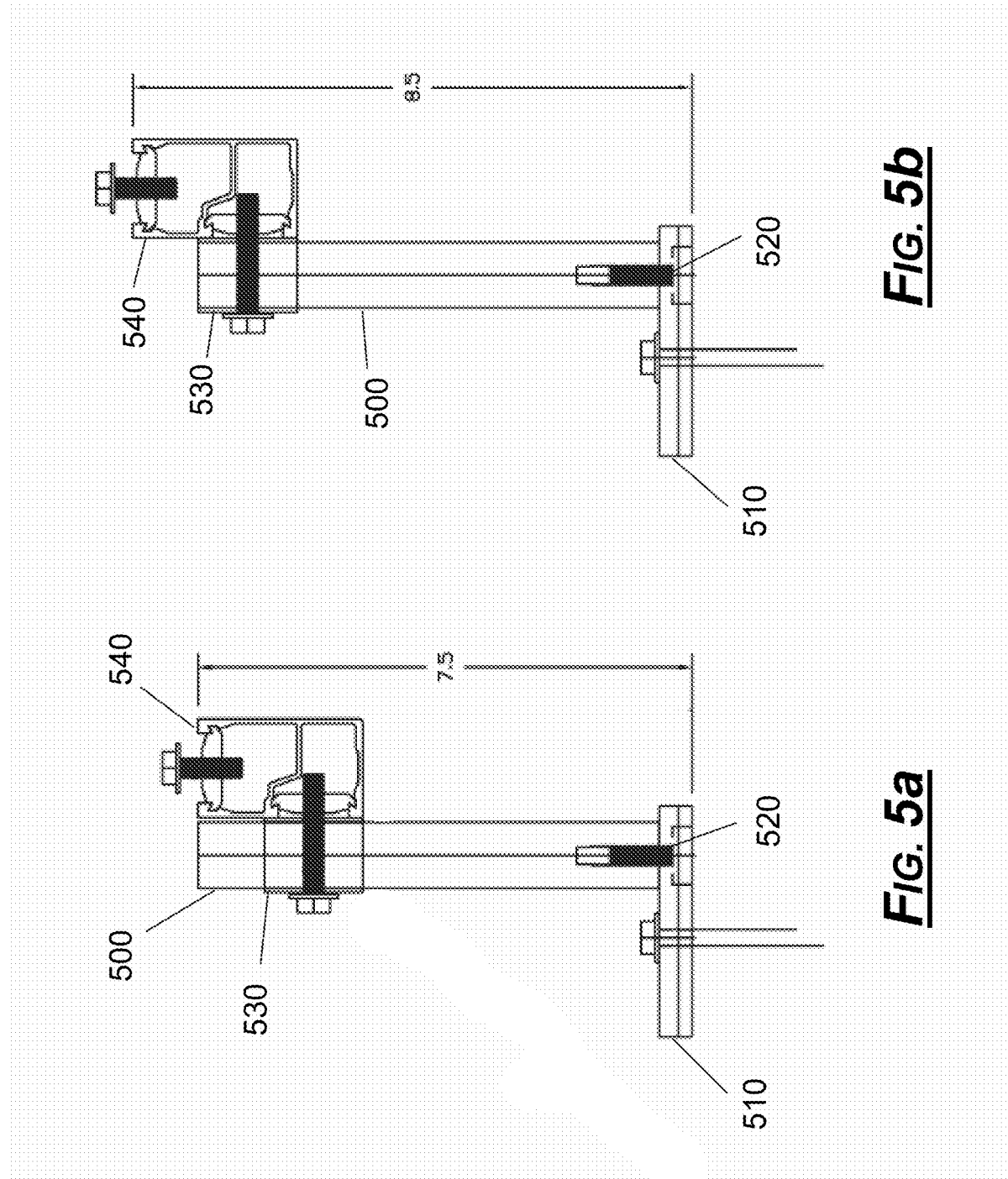

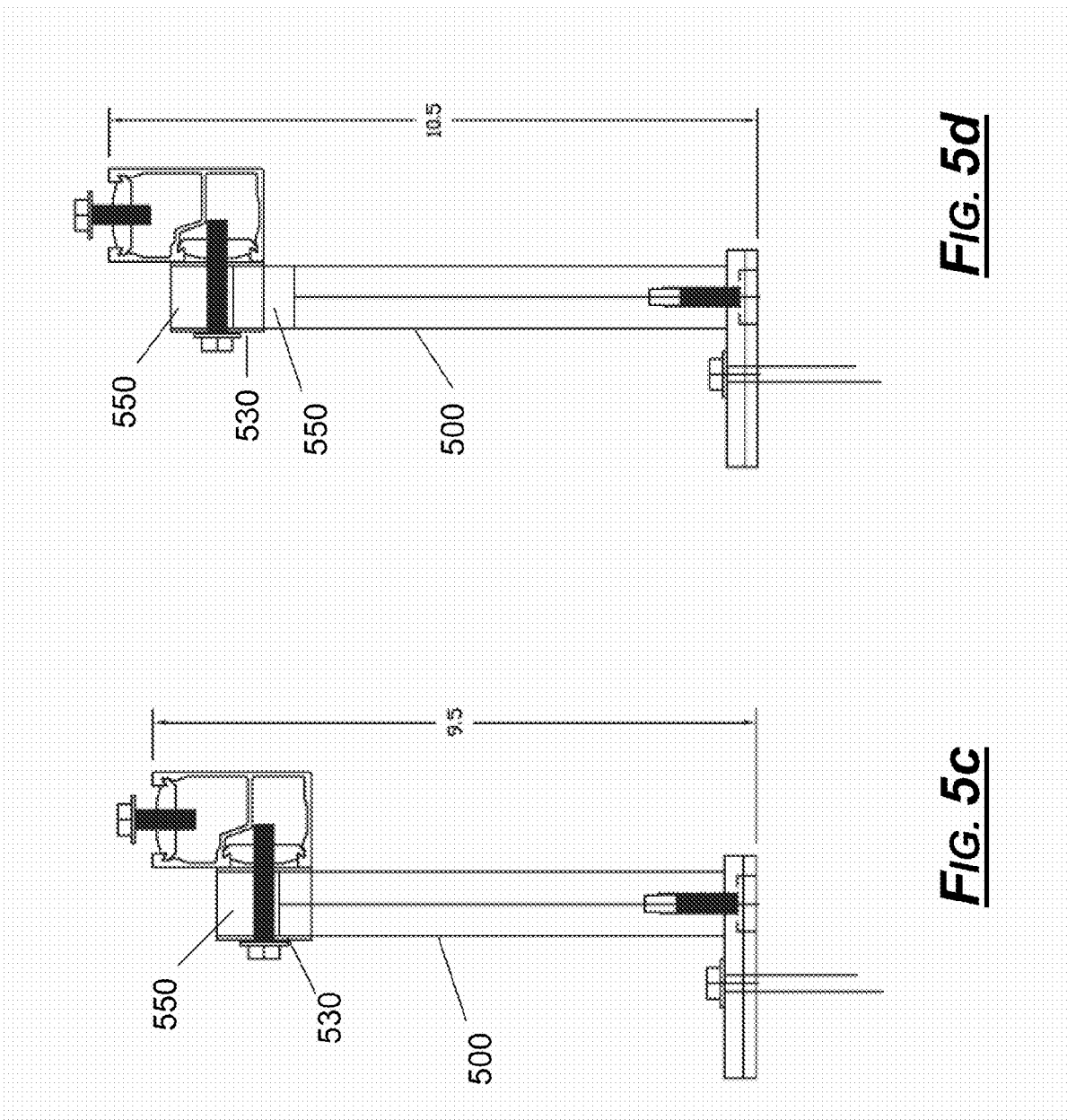

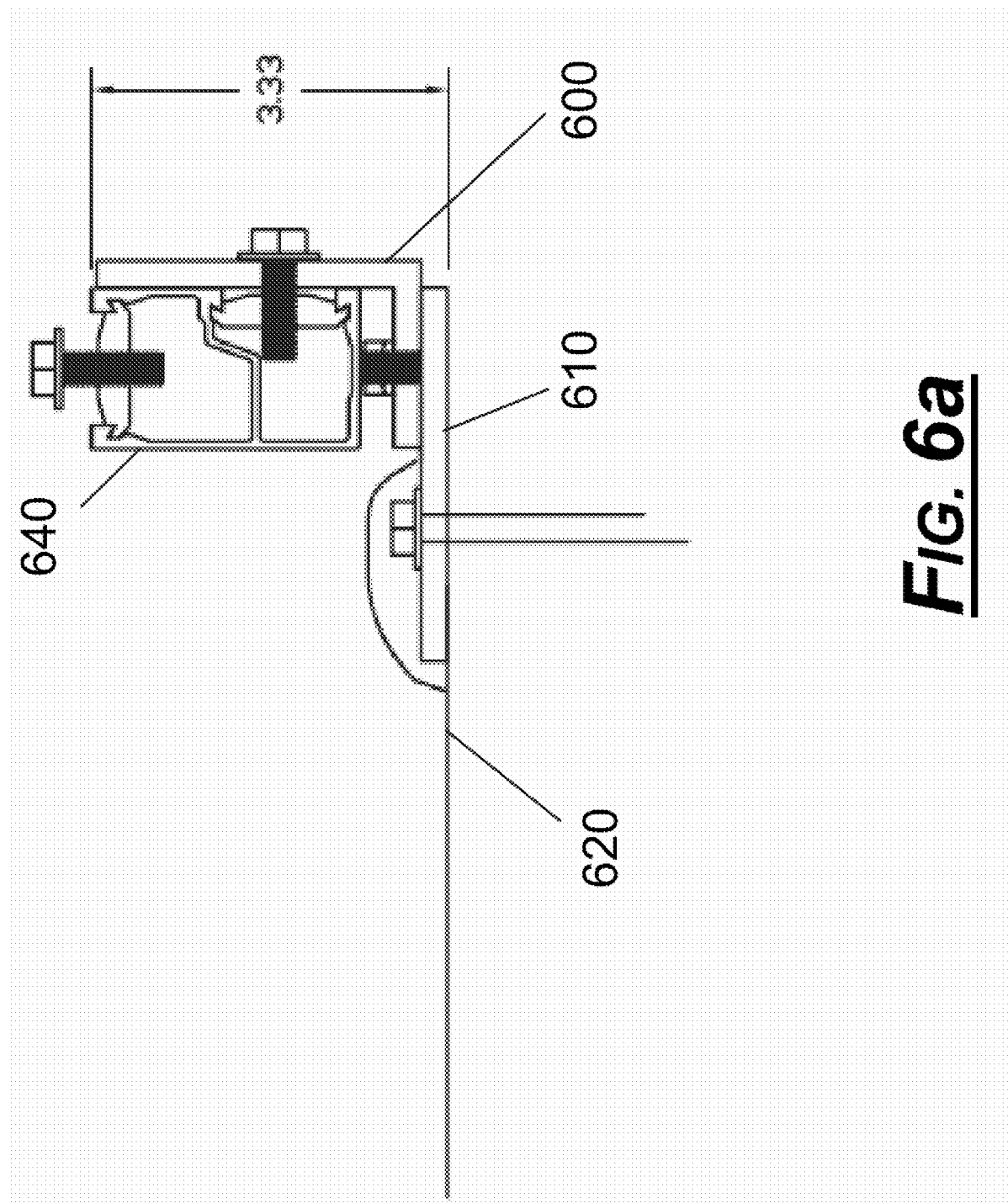

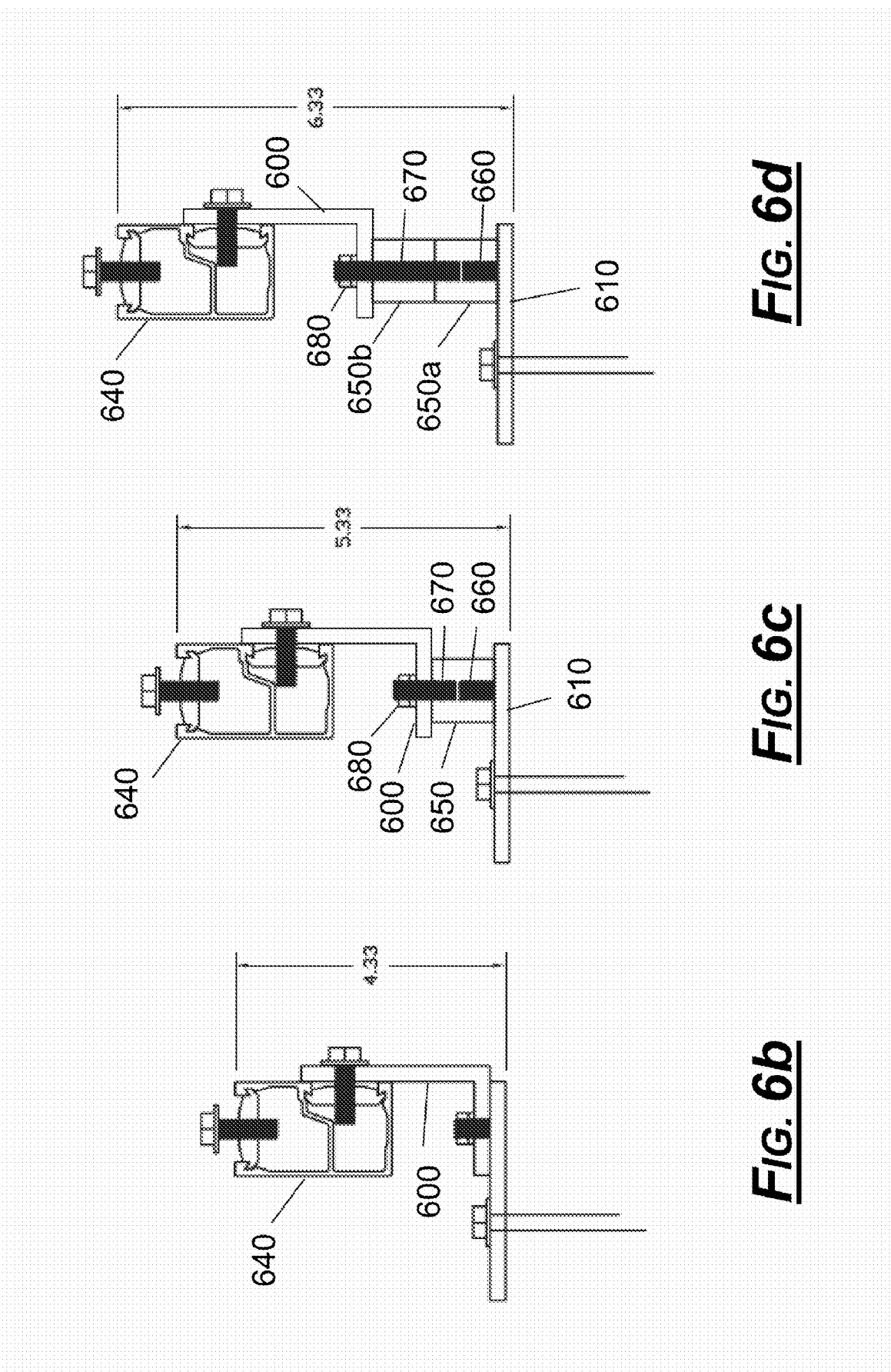

MODULE ATTACHMENT APPARATUS

CROSS-REFERENCE TO RELATED APPLICATIONS

This application claims priority to U.S. Provisional Patent Application Ser. No. 61/071,891, entitled "Device and Method for Solar Panel Installation," filed May 22, 2008, which is hereby incorporated by reference in its entirety. This application is related to U.S. patent application Ser. No. 12/470,682, entitled "Universal End Clamp," filed May 22, 2009, and U.S. patent application Ser. No. 12/470,588, entitled "Camming Clamp for Roof Seam," filed May 22, 2009.

FIELD OF THE INVENTION

The invention relates generally to securing a solar module or other component to a surface.

BACKGROUND

Solar energy generation is a rapidly growing technology worldwide and offers the potential of almost unlimited clean and sustainable energy. However, the use of solar electric technology has been limited by the costs associated with installing solar panels to existing and new structures and facilities.

Solar cell array installation is a very specialized line of work and requires special equipment and expertise. Because solar modules need maximum exposure to sunlight to operate efficiently, they are often installed on the rooftops of structures or buildings. Rooftops are convenient because they typically represent unused space on a structure. Rooftops are also less prone to vandalism or theft than locations that are accessible from the ground. While rooftops are often good locations to install solar modules, they introduce a number of complications into the installation process. Most notably, rooftop installations introduce increased risk of water leakage as components are fixed through roofing membranes and into structural members below. Some conventional installations require bolting a support component directly to the roof, which can cause leakage from water that seeps in from the separation between roof tiles. Rooftop surfaces are often visible and require a smooth, level installation, which is often at odds with the undulating, settled surfaces common in roof surfaces. Working on roof surfaces typically introduces numerous access and safety challenges which must be overcome, and therefore limiting the amount of time for installation or maintenance on the roof is highly advantageous to an installer.

For these reasons, it is desirable to have a solar cell array mounting solution that offers robust protection against the elements, has an adaptive configuration for accommodating roof and other mounting surface irregularities, and contains features that make installation as quick and efficient as possible to minimize installation time on the roof.

Solar panel performance is closely tied to the orientation of a module as it operates. Because systems to track the sun can be expensive and can require a lot of surface area of a roof, modules are typically mounted fixed in the orientation that yields the best annual energy or cost performance. Tilt angles in the range of 10 to 20 degrees are most common, with higher angles found in higher latitudes or off-grid systems with greater demand for production in winter months. For this reason, some complete solar cell array installation solutions include tilt options for the modules when they are installed on flat or low tilt situations.

Large commercial roof spaces are often subject to this flat roof, tilt configuration requirement. However, due to the complexity of commercial roof construction and the high reliability requirement of commercial roof membranes, roof penetrations may be exceedingly expensive in commercial applications. In some conventional systems, a rail can only be attached to a support at certain locations, which can make tilting and height adjustments difficult and installation can be more time consuming.

When installing components in some conventional systems, a module is attached to a rail by sliding a securing mechanism along the length of the rail to the desired mounting point. A similar procedure is sometimes utilized for securing the rail to a support component on the roof. As a result, the process may require added time for sliding each securing mechanism to the appropriate rail position. It is desirable to have a securing mechanism that can be inserted into the rail at the point of desired mounting.

SUMMARY OF THE INVENTION

Various embodiments described herein attempt to overcome the drawbacks of the conventional techniques and devices for solar cell array installation. The systems, methods, and devices described herein can offer, among other advantages, decreased cost of installing solar cell arrays or components thereof.

In one embodiment, a nut for securing a component to a rail comprises an aperture for receiving a bolt; a first flange configured for engaging a first recess on a first side of the rail; and a second flange configured for engaging a second recess on a second side of the rail opposing the first side of the rail, wherein the nut is configured to be inserted or removed from the rail at an angle.

In another embodiment, an assembly for securing a component to a roof comprises a base configured to be secured to the roof, a flashing installed over the base including a rectangular portion configured to extend toward a higher elevated side of the roof and to be installed under a shake, shingle, slate, or tile, and a domed portion configured to substantially cover the base; and a support secured to the base through a securing component that extends from the base and through the flashing, wherein the support is configured to secure a module or a rail.

In yet another embodiment, an assembly comprises a base; a post secured to and extending from the base; a clamp configured for securing a rail, module, or supporting component to the post. The clamp comprises a post-receiving aperture for receiving the post; a first flange; a second flange; a void between the first and second flanges, wherein the void abuts the aperture; and a securing aperture for receiving a securing component for securing the rail or module to the clamp, wherein rotating the securing component causes the first flange to approach the second flange and decrease the size of the post-receiving aperture.

In another embodiment, an assembly for securing a component to a base comprises a post; a clamp secured to the component, wherein the clamp is adjustable substantially along the length of the post; and at least one spacer secured to the post, wherein the clamp is adjustable substantially along the length of the spacer.

In yet another embodiment, an assembly for securing a component to a base comprises a support component configured to be secured to the base and for securing the component; and at least one spacer secured to the support component.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures:

FIG. 1g shows a cross-sectional view of a snap-in channel nut in a third installation stage according to an exemplary embodiment.

FIG. 2b shows an exploded cross-sectional view of an L-foot and flashing assembly according to an exemplary embodiment.

FIG. 2c shows a cross-sectional view of an L-foot and flashing assembly according to an exemplary embodiment.

FIG. 3a shows a perspective view of a base according to an exemplary embodiment.

FIG. 3b shows a perspective view of a flashing according to an exemplary embodiment.

FIG. 4a shows an exploded perspective view of a post clamp according to an exemplary embodiment.

FIG. 4d shows a perspective view of a post clamp according to an alternative exemplary embodiment.

FIG. 5a shows a cross sectional view of a clamp assembly according to an exemplary embodiment.

FIG. 5b shows a cross sectional view of a clamp assembly according to an exemplary embodiment.

FIG. 5c shows a cross sectional view of a clamp assembly according to an exemplary embodiment.

FIG. 5d shows a cross sectional view of a clamp assembly according to an exemplary embodiment.

FIG. 6a shows a cross sectional view of an L-foot assembly according to an exemplary embodiment.

FIG. 6b shows a cross sectional view of an L-foot assembly according to an exemplary embodiment.

FIG. 6c shows a cross sectional view of an L-foot assembly according to an exemplary embodiment.

FIG. 6d shows a cross sectional view of an L-foot assembly according to an exemplary embodiment.

DETAILED DESCRIPTION

Figure 1A:
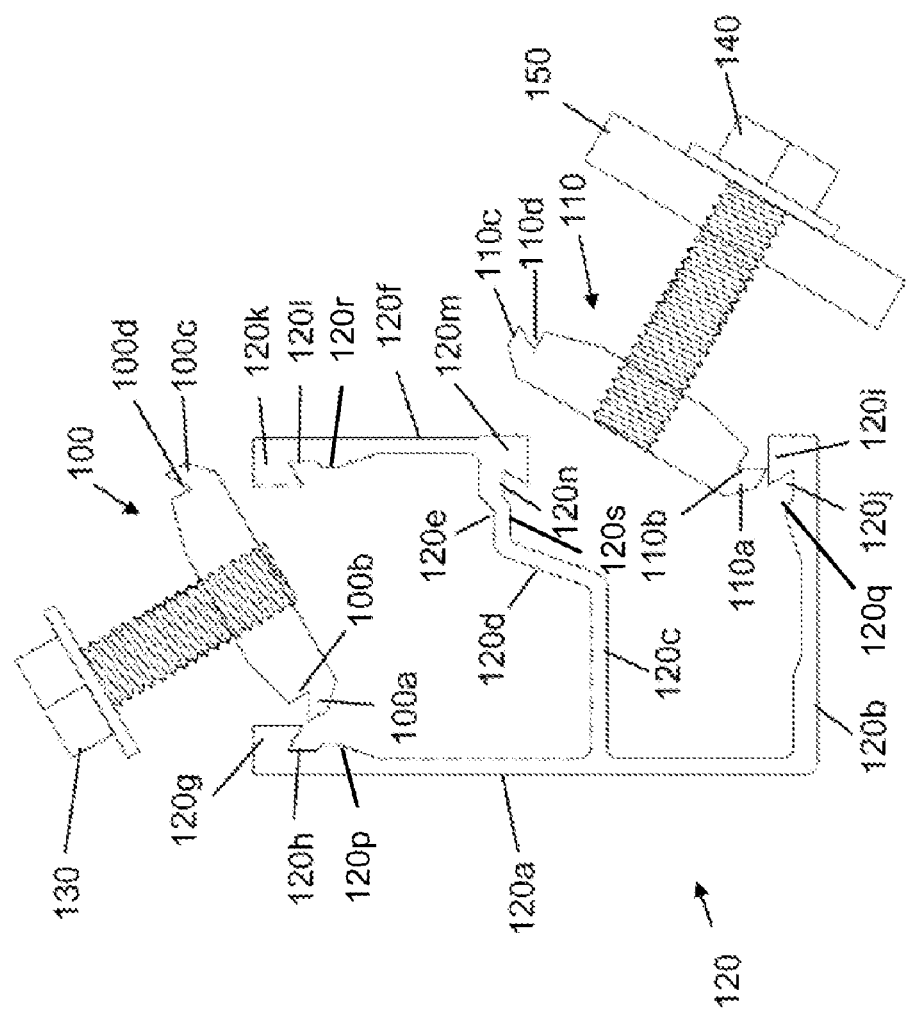
FIG. 1a shows a cross-sectional view of a snap-in channel nut in a first installation stage according to an exemplary embodiment.

Reference will now be made in detail to the preferred embodiments of the present invention, examples of which are illustrated in the accompanying drawings.

Although the exemplary embodiments describe a solar module and solar module installation, the description herein is intended to include any component of a solar cell array to be secured, including, but not limited to, a photovoltaic array, a photovoltaic module, a solar cell, a rail, a solar panel, a solar tracker, a mounting post or pole, a mounting bracket, or other related hardware. However, the term module is not intended to be limited only to components used for solar energy and solar component installation. The module can apply to any component that can be secured to a roof or other surface, including, but not limited to, a satellite dish, an antenna, and HVAC equipment.

Referring to FIGS. 1a to 1d, an exemplary embodiment showing a cross-sectional view of an installation of a snap-in channel nut 100, 110 is shown. Although this exemplary embodiment shows the installation of the snap-in channel nut 100, 110, the snap-in channel nut 100, 110 can be removed by using substantially the reverse method. Also, although two snap-in channel nuts 100, 110 are shown being installed into a rail 120, it is intended that an installation may utilize only one snap-in channel nut. In one example, only snap-in channel nut 110 is used because the rail 120 attaches to a module using means other than the snap-in channel nut 100. In another example, only snap-in channel nut 100 is used because the rail 120 is attached to a roof support using means other than the snap-in channel nut 110. Although the exemplary embodiment describes the installation and configuration of the snap-in channel nut 100 in substantially the same way as snap-in channel nut 110, each snap-in channel nut 100, 110 is not required to be identical to each other.

The rail 120 can secure at least one module (not shown) and the rail 120 can be secured to a roof or other surface (not shown). As known by one of ordinary skill in the art, the rail 120 can be configured in different ways and is not limited to the configuration or orientation described in this exemplary embodiment. The rail 120 has a first component 120a and a second component 120b configured perpendicular to the first component 120a. At approximately the mid-point of the first component 120a, a third component 120c extends from the rail 120 in a direction substantially parallel to the second component 120a. A fourth component 120d extends in a substantially perpendicular direction from the third component 120c in a direction substantially parallel with the first component 120a. A fifth component 120e extends in a substantially perpendicular direction from the fourth component 120d in a direction substantially parallel with the second component 120b. A sixth component 120f extends in a substantially perpendicular direction from the fifth component 120e in a direction substantially parallel to the first component 120a.

At a distal end of the first component 120a, a first flange 120g extends toward the center of the rail 120, thereby forming a recess 120h. In this exemplary embodiment, the rail 120 can have a greater thickness, or bump 120p, at a point before the recess 120h on the first component 120a. At a distal end of the second component 120b, a second flange 120i extends toward the center of the rail 120, thereby forming a recess 120j. In this exemplary embodiment, the rail 120 can have a greater thickness, or bump 120q, at a point before the recess 120j on the second component 120b. At a distal end of the sixth component 120f, a third flange 120k extends toward the center of the rail 120, thereby forming a recess 120l. In this exemplary embodiment, the rail 120 can have a greater thickness, or bump 120r, at a point before the recess 120l on the sixth component 120f. The third flange 120k opposes the first flange 120g. At substantially the intersection of the fifth component 120e and the sixth component 120f, a fourth flange 120m can extend to form a recess 120n. The fifth component 120e can be shaped to form bump 120s at a point before the recess 120n. In this exemplary embodiment, the rail 120 can extend to on the opposing side of the recess 120n from the fourth flange 120m. The fourth flange 120m opposes the second flange 120i.

In the exemplary embodiment shown, the distal ends of the first component 120a and the sixth component 120f can be used to support a module. The distal end of the second component 120b and the area near the intersection of the fifth component 120e and the sixth component 120f can be used to secure the rail 120 to a support member. One advantage to this configuration of rail 120, and as can be seen in FIG. 1d, is that wires or cables 120o can be run along a channel (e.g., between first component 120a and sixth component 120f) and the snap-in channel nut 100 can still be installed without interfering with the wires or cables 120

The rail 120 can be made of a conductive material, such as aluminum or stainless steel, or a non-conductive material, such as fiberglass, which can eliminate the need to ground the rail 120 when a solar cell module is attached.

The snap-in channel nut 100 is shown as a cross-section, but is substantially rectangular. The nut 100 has an aperture configured to receive a threaded bolt 130. The nut 100 has a first flange 100a configured to engage recess 120h. The extension of the flange 100a causes a recess 100b. Recess 100b is configured to engage the first flange 120g of the rail 120. The nut 100 also has a second flange 100c configured to engage recess 120l. The extension of the flange 100c causes a recess 100d. The recess 100d is configured to engage the third flange 120k of the rail 120.

The snap-in channel nut 110 is shown as a cross-section, but is substantially rectangular. The nut 110 has an aperture configured to receive a threaded bolt 140. The nut 110 has a first flange 110a configured to engage recess 120j. The extension of the flange 110a causes a recess 110b. Recess 110b is configured to engage the second flange 120i of the rail 120.

The nut 110 also has a second flange 110c configured to engage recess 120n. The extension of the flange 110c causes a recess 110d. The recess 110d is configured to engage the fourth flange 120m of the rail 120. The nut 110 can secure a mounting component or support 150 to the rail 120.

The nut 100, 110 and/or bolt 130, 140 can be composed of any known or convenient material, including, but not limited to metal, fiberglass, plastic, wood, composites or any other combination of materials. The nut 100, 110 can be manufactured by any process known in the art, including extrusion and cold-forging.

As shown in FIG. 1a, the nut 100, 110 can be inserted into the rail by angling the nut 100, 110. Because of the flanges 100a, 100c, 110a, 110c, the nut 100, 110 cannot fit into the opening in the rail 120 without orienting the nut 100, 110 at an angle.

Figure 1B:
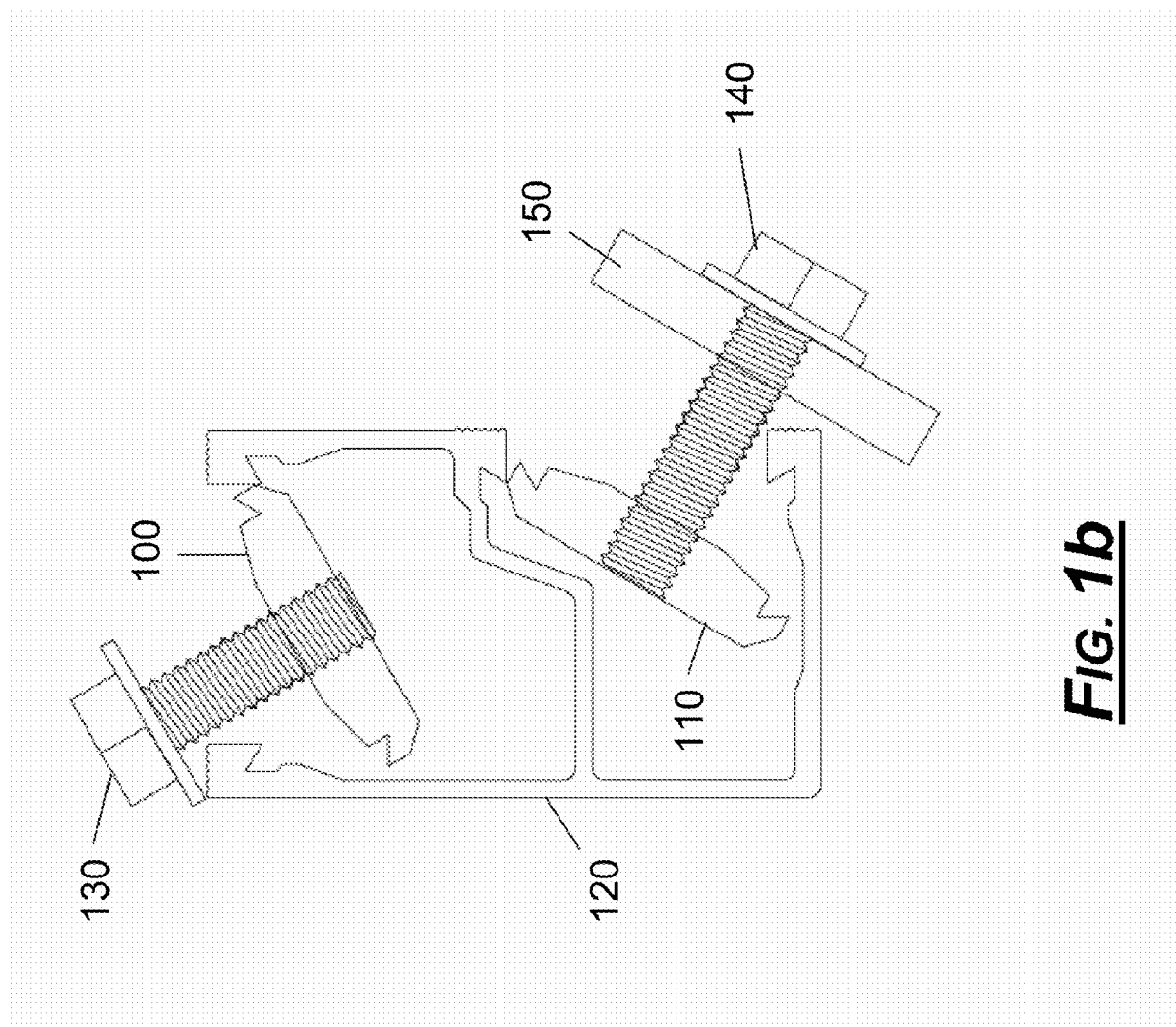
FIG. 1b shows a cross-sectional view of a snap-in channel nut in a second installation stage according to an exemplary embodiment.

As shown in FIG. 1b, the nut 100, 110 has been inserted into the rail 120 by orienting the nut 100, 110 at an angle. The depth of insertion of the nut 100, 110 may be limited by the placement of the head of the bolt 130, 140 or the support 150.

Figure 1C:
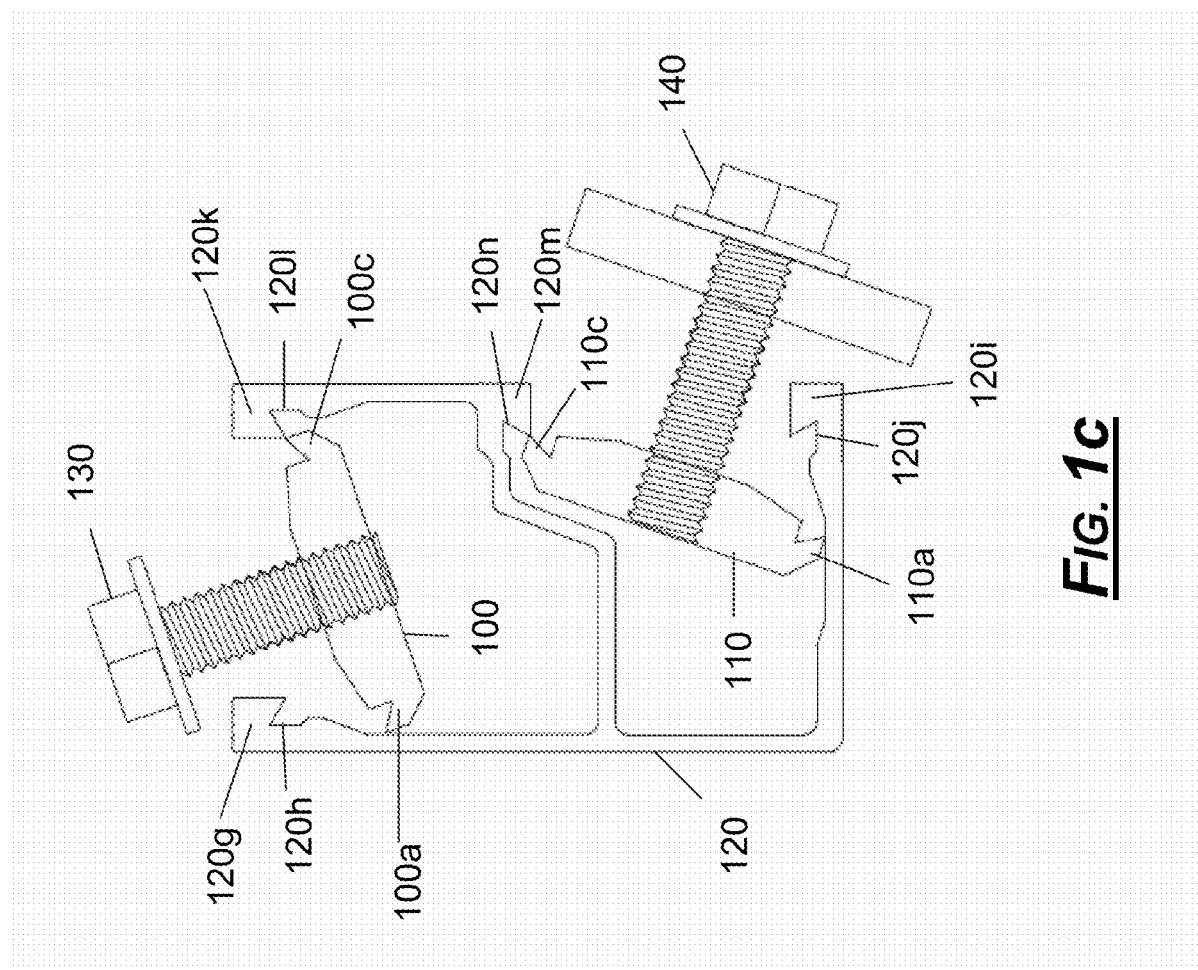
FIG. 1c shows a cross-sectional view of a snap-in channel nut in a third installation stage according to an exemplary embodiment.
Figure 1D:
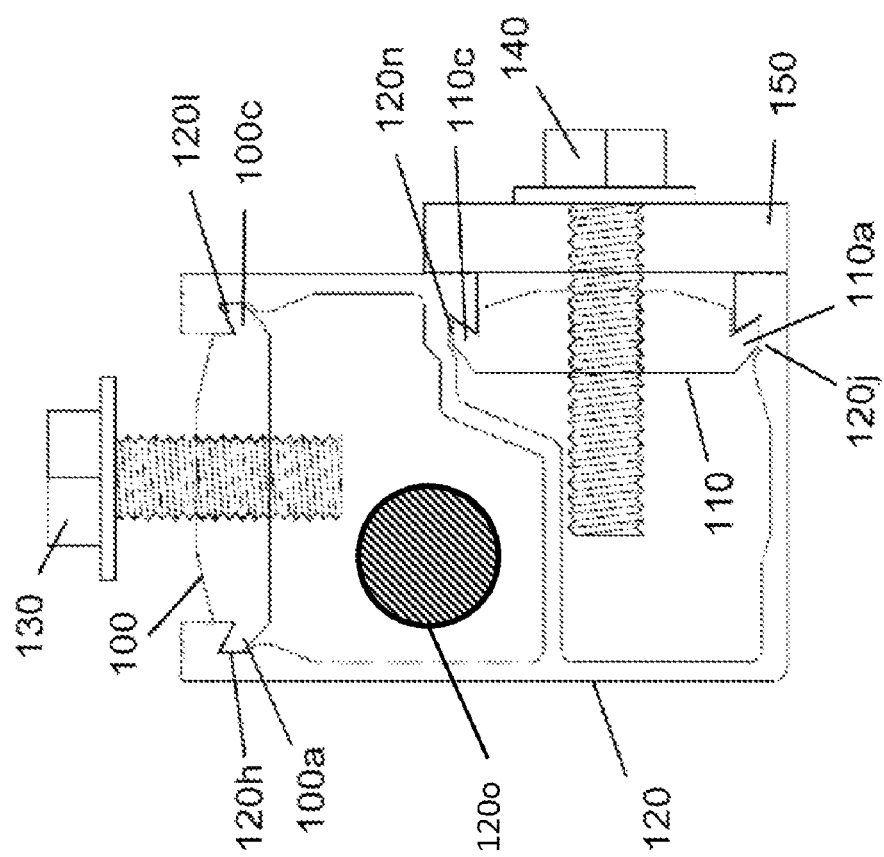
FIG. 1d shows a cross-sectional view of a snap-in channel nut in a fourth installation stage according to an exemplary embodiment.
Figure 1E:
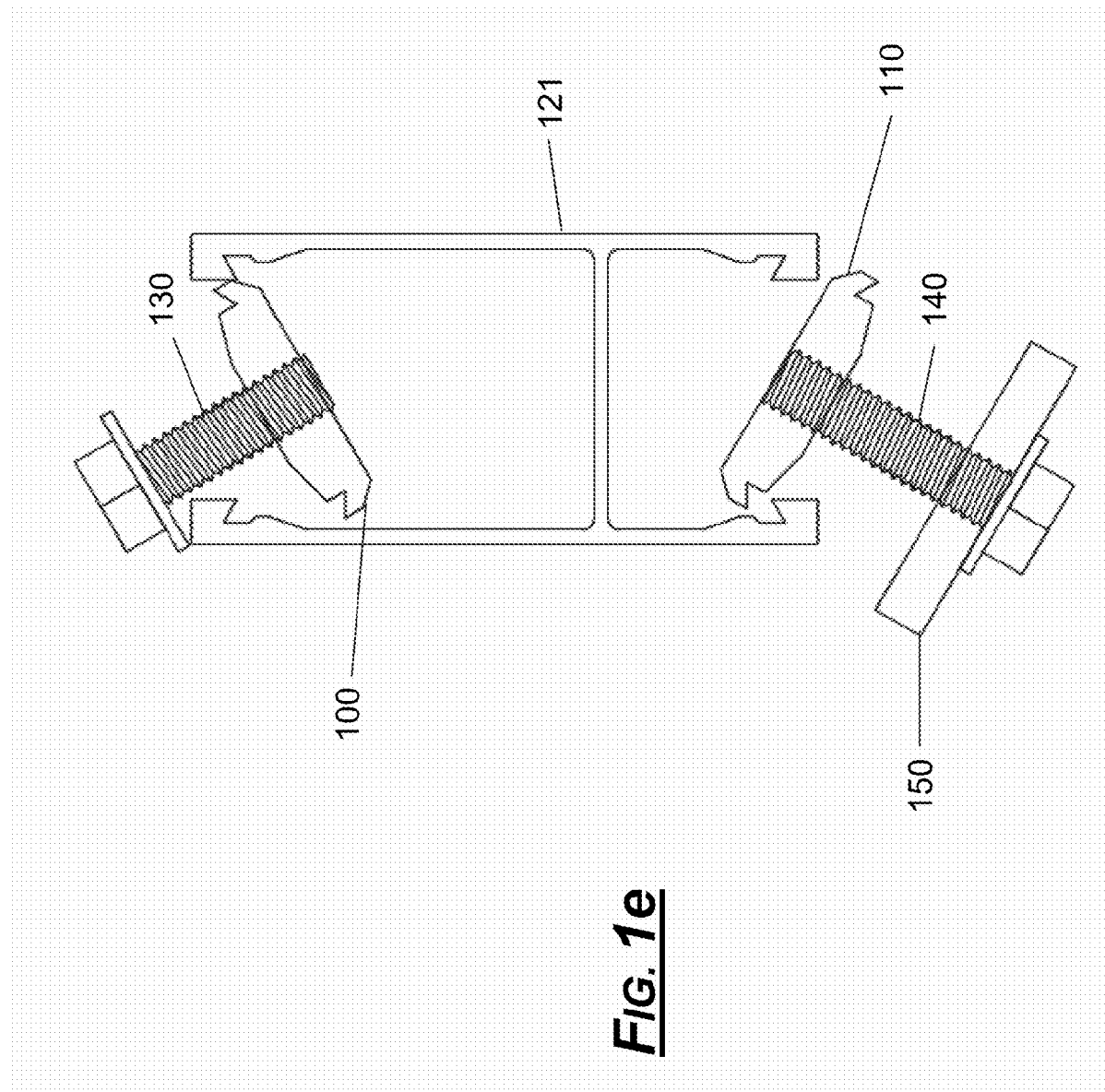
FIG. 1e shows a cross-sectional view of a snap-in channel nut in a first installation stage according to an exemplary embodiment.
Figure 1F:
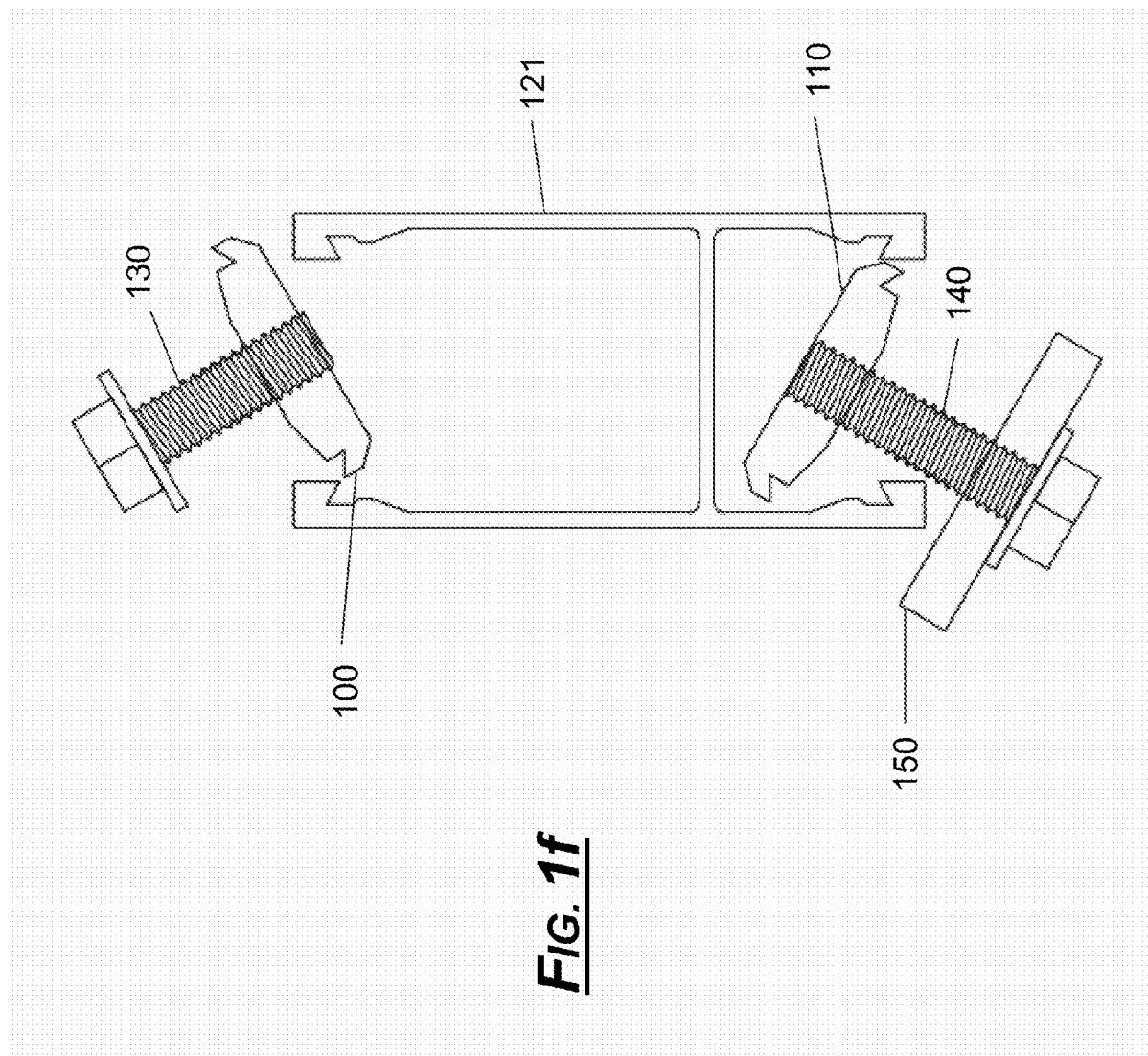
FIG. 1f shows a cross-sectional view of a snap-in channel nut in a second installation stage according to an exemplary embodiment.
Figure 1H:
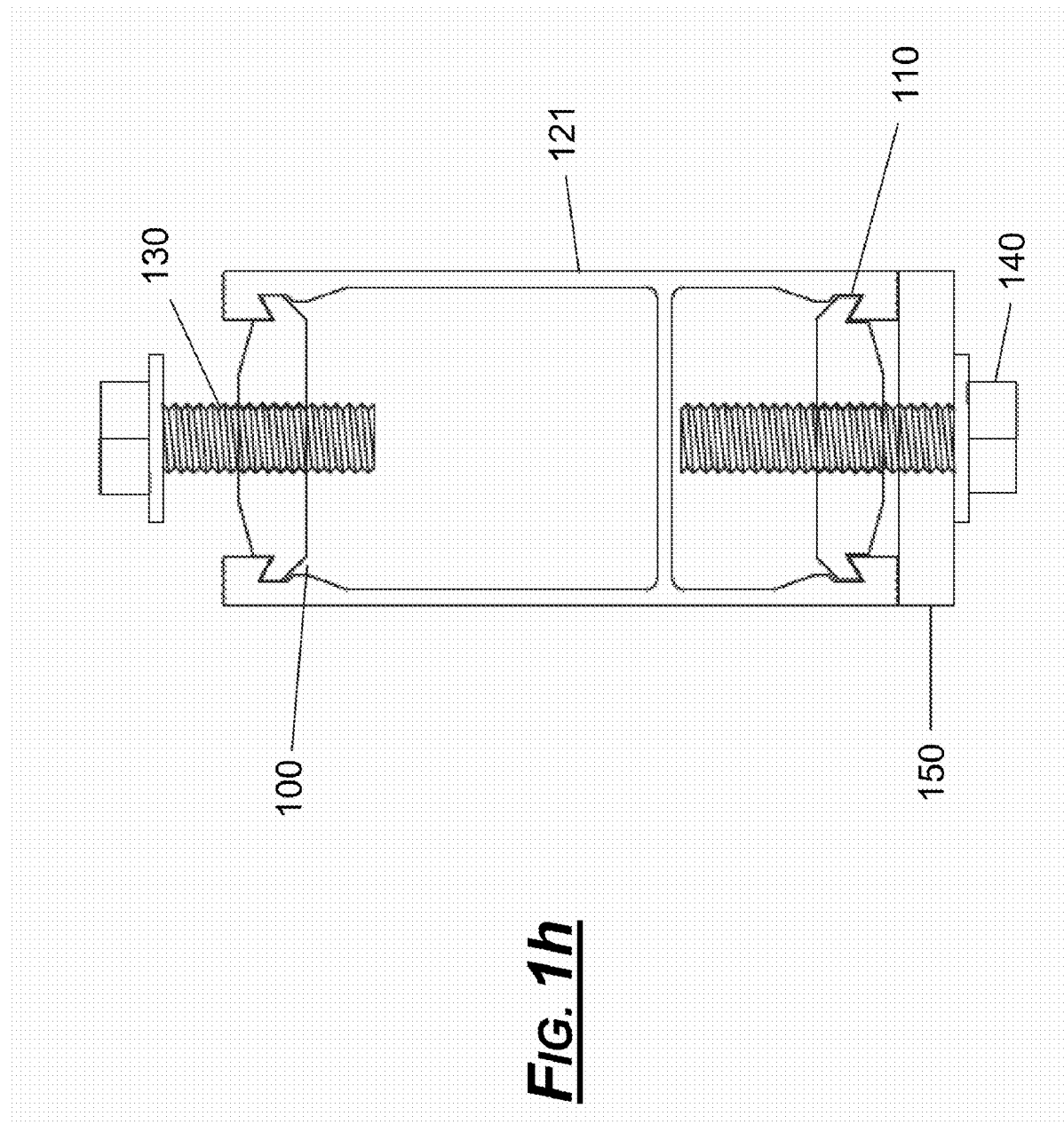
FIG. 1h shows a cross-sectional view of a snap-in channel nut in a fourth installation stage according to an exemplary embodiment.

As shown in FIG. 1c, the nut 100, 110 is oriented such that the bolt 130, 140 is more aligned with the direction of insertion. This orientation allows the nut 100, 110 to be inserted even further into the rail 120. The nut 100, 110 is inserted into the rail 120 until the flanges 100a, 100c, 110a, 110c are inserted past the flanges 120g, 120i, 120k, 120m.

As shown in FIG. 1d, the nut 100, 110 can be secured by pulling the nut 100, 110 in a direction out of the rail 120 so that the flanges 100a, 100c, 110a, 110c engage recesses 120h, 120j, 120l, 120n. The configuration of the recesses 120h, 120j, 120l, 120n and the thicker rail portions, or bumps 120p, 120q, 120r, and 120s, before the recesses 120h, 120j, 120l, 120n can allow the nut 100, 110 to snap into the recesses 120h, 120j, 120l, 120n. The bolt 130, 140 can then be tightened to secure a module (not shown) or the support 150 to the rail 120. The nut 100, 110, can be removed in substantially the reverse method shown. This configuration can allow a user to more easily install and remove a module or support from a rail. Additionally, this configuration can allow a user to install and remove the module or support from a rail at any point along the rail without sliding the nut to or from the end of the rail.

The nut 100, 110 can be installed in other rail configurations. For example, as shown in FIGS. 1e to 1h, the nut 100, 110 can be installed in a rail 121 configured for attachment to a ground mounting system (not shown) that has an existing substructure, including awnings and carports. The installation, removal, and adjustment of the nut 100, 110 in FIGS. 1e to 1h can be performed according to the method described with respect to FIGS. 1a to 1d.

FIGS. 2a to 2d show a system 200 for securing a rail 210 to a composition roof 220. Although the rail 210 is shown in the exemplary embodiment, it is intended that this system 200 can be applied to secure any support member, module, or other component to the roof 220. Indeed, the support member can secure any number of rails or structural components, can be secured to a variety of roof types, can be installed on trellises and on motor vehicles, such as motorhomes.

The roof 220 is generally made of a roof decking component 220a and a rafter component 220b. The roof 220 is typically oriented in a tilt, wherein a first end 220c of roof 220 is elevated higher than a second end 220d. The composition roof 220 can include a wood shake, shingle, and slate installation. Although the composition roof 220 is shown in a preferred embodiment, it is intended that the system 200 can be configured for other types of roofs, such as a concrete tile roof.

Figure 2A:
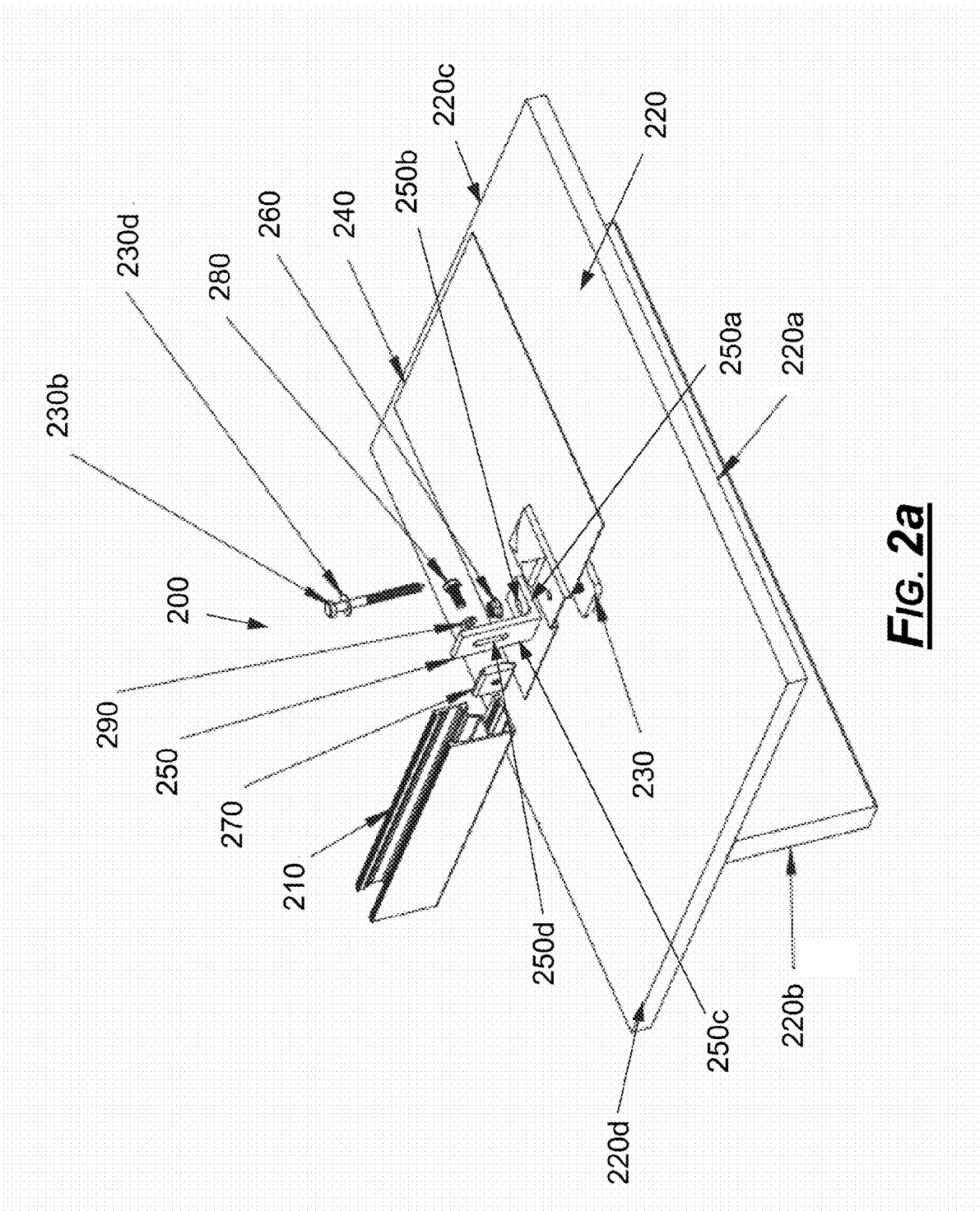
FIG. 2a shows an exploded perspective view of an L-foot and flashing assembly according to an exemplary embodiment.
Figure 2D:
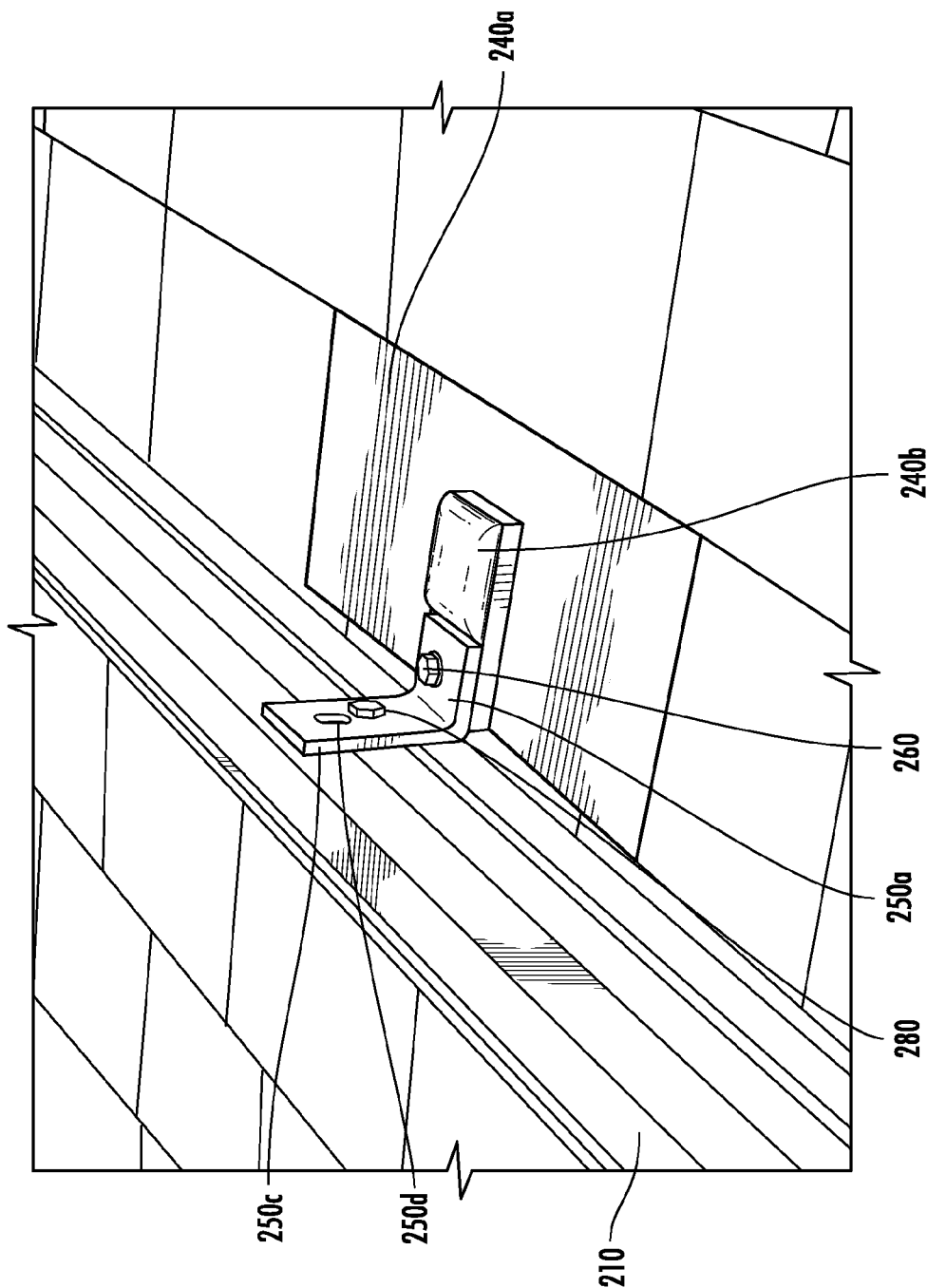
FIG. 2d shows a perspective view of an L-foot and flashing assembly according to an exemplary embodiment.
Figure 2E:
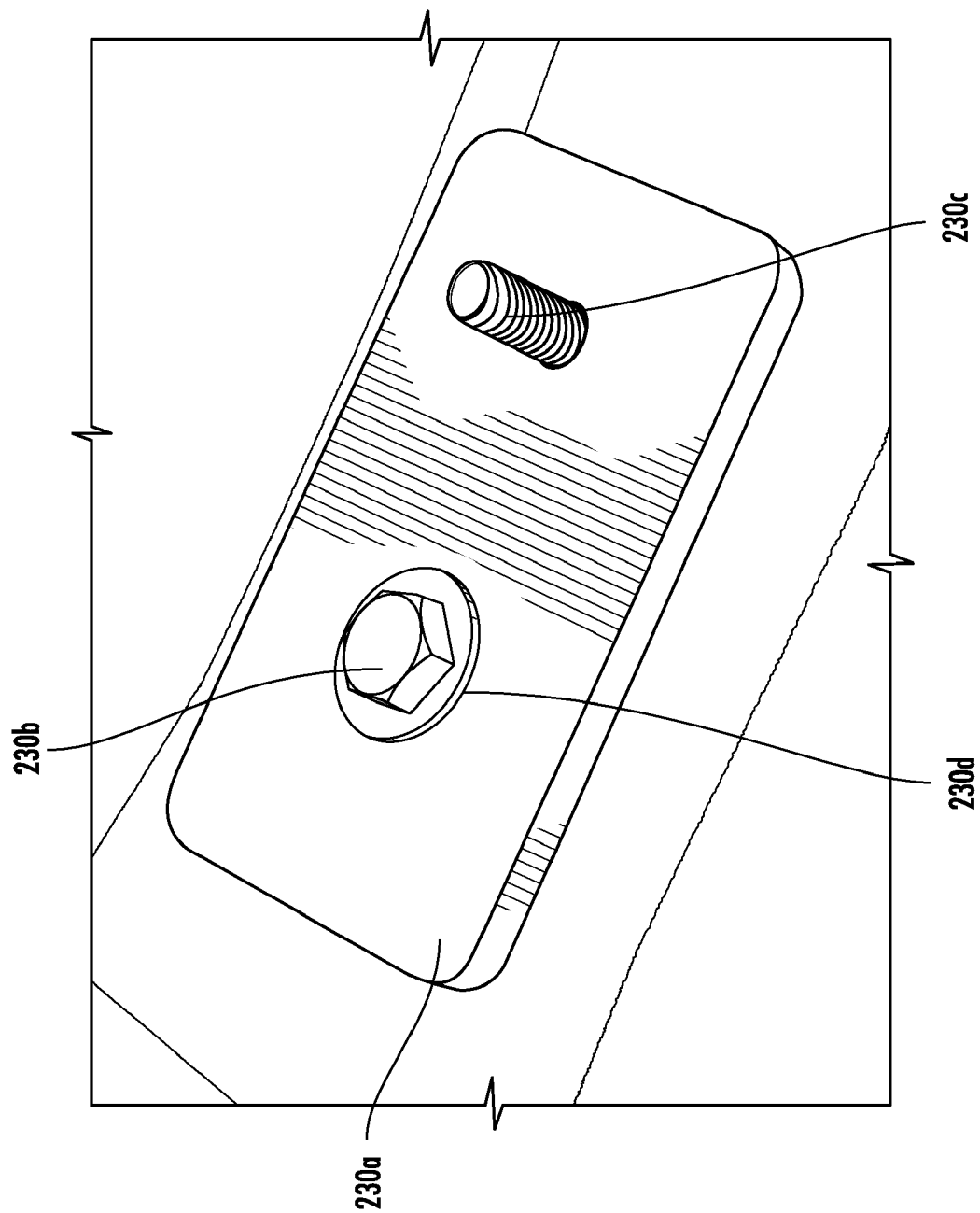
FIG. 2e shows a perspective view of a base according to an exemplary embodiment.

The system 200 includes a base 230, a flashing 240, and an L-foot 250. As shown in FIG. 2e, The base 230 is shown as a rectangular component 230a (shown in FIG. 2e) having an aperture for receiving a lag bolt 230b. The lag bolt 230b, along with a washer 230d, can secure the base 230 to the roof 220. In this example, the lag bolt 230b is configured to screw into the rafter component 220b. A threaded stud 230c (shown in FIG. 2e) extends upwards from the base 230 for securing the L-foot 250. The base 230 can be sealed to the roof 220.

Figure 2F:
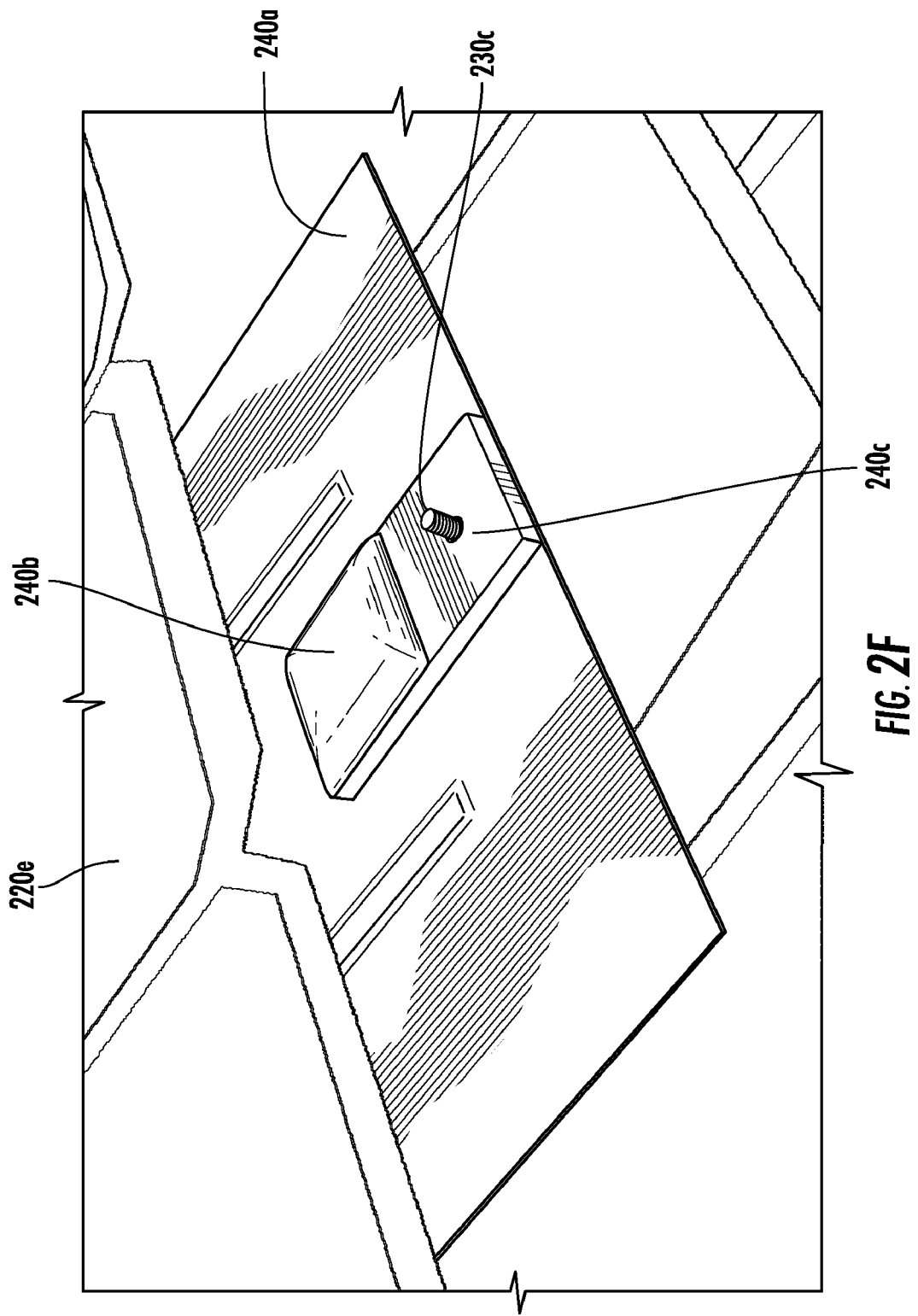
FIG. 2f shows a perspective view of a flashing according to an exemplary embodiment.

The flashing 240 is positioned over the base 230. The flashing 240 is shown as a substantially flat rectangular component 240a (shown in FIG. 2d) having a dome 240b (shown in FIG. 2d) configured to cover the base 230, which protrudes from the surface of the roof 220. The dome 240b can be made of may be any weather resistant material known and/convenient, such as plastic, rubber, or metal. The flashing 240a and the dome 240b are formed, for example by stamping, the flashing 240 from a single piece of sheetmetal such that the flashing 240a and the dome 240b are integrally coupled. The flashing 240 also has an aperture 240c (shown in FIG. 2f) for receiving the threaded stud 230c. The flashing 240 provides a watertight seal around the base 230. The flashing 240 extends a distance toward the first end 220c of roof 220 so that a shingle 220e of the roof can overlap the flashing 240, as shown in FIG. 2f. The flashing 240 can be made of galvanized steel or other material known to one of ordinary skill in the art.

The L-foot 250 acts as a support having an L-foot base 250a that is secured to the threaded stud 230c through an aperture 250b using a flange nut 260. An L-foot extension 250c extends from the L-foot base 250a at about 90 degrees. The L-foot extension 250c has an elongated aperture 250d for securing the L-foot 250 to the rail 210, shown in the exemplary embodiment with a channel nut 270. The elongated shape of aperture 250d can allow for fine-tuned height adjustments. A bolt 280 and a washer 290 can be used to secure the L-foot 250 to the channel nut 270.

Figure 3C:
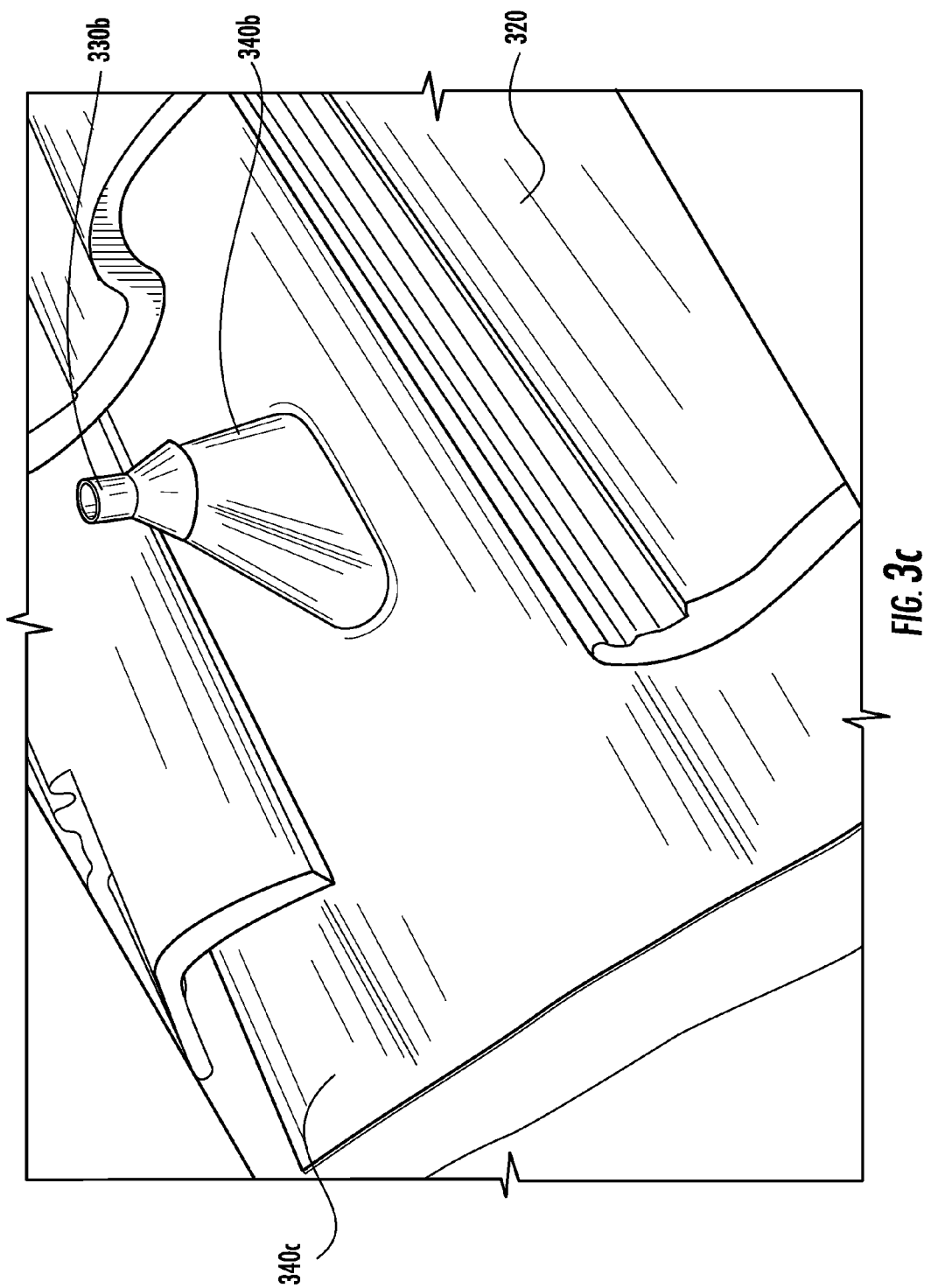
FIG. 3c shows a perspective view of a flashing according to an alternative exemplary embodiment.
Figure 3D:
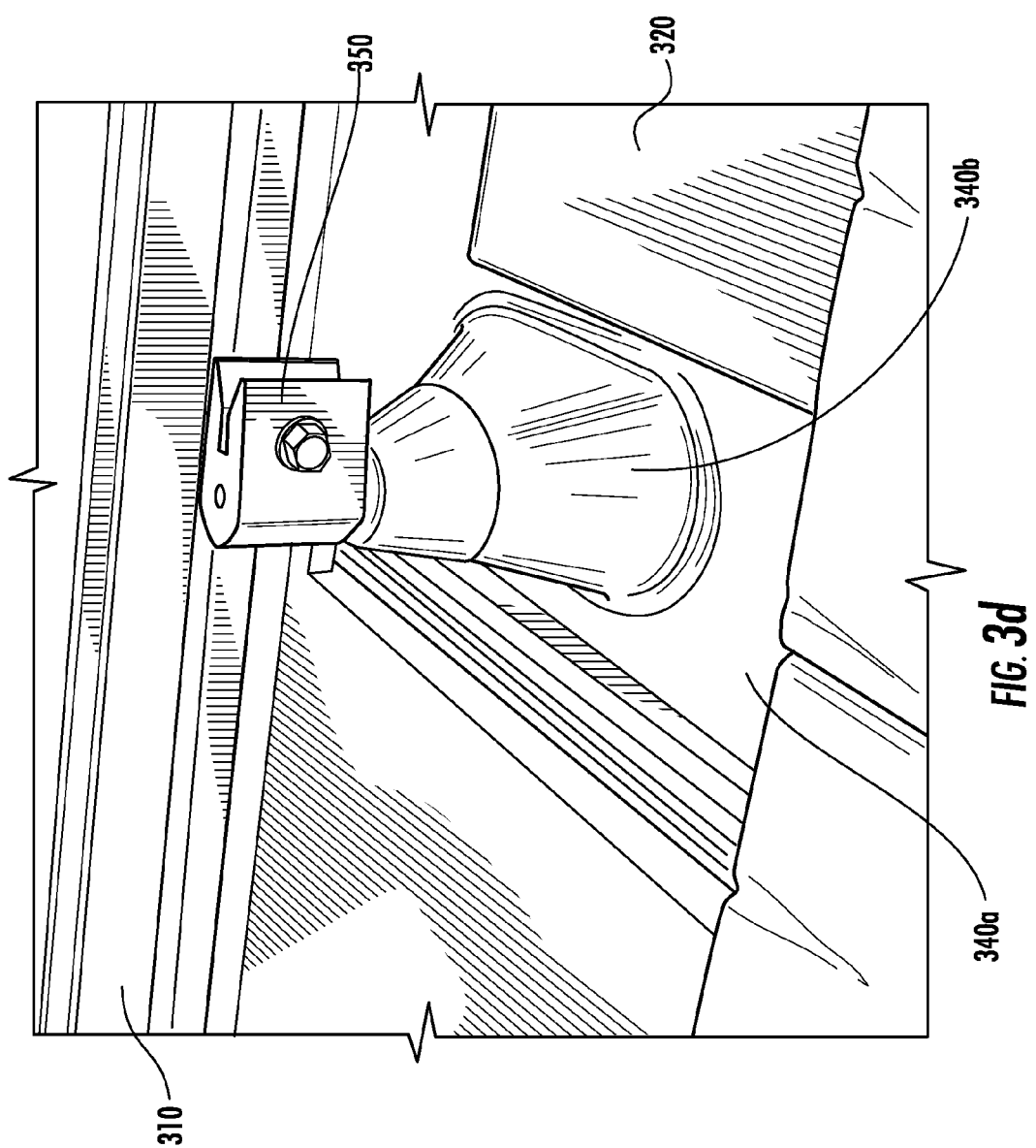
FIG. 3d shows a perspective view of a flashing system according to an exemplary embodiment.

As shown in FIGS. 3a to 3d, an alternative system is shown with full flashing. In this exemplary embodiment, a base 330a is secured to a roof 320 by a bolt 330b. A post 330b attached by a bolt (similarly shown as bolt 415 in FIG. 4a) extending from the base 330a extends away from the roof 320. A flashing 340 can be installed over the base 330a and substantially over the post 330b as shown in FIG. 3b. The flashing has a substantially flat rectangular component 340a and a post flashing component 340b that substantially covers the base 330a and the post 330b. The post flashing component 340b can be substantially cone-shaped. In an alternative embodiment shown in FIG. 3c, a rectangular component 340c can mimic the undulating shape of the roof 320 to allow for better protection of the base 330a. Once the flashing 340 has been installed, the post 330b can be secured to a rail 310 or other component using a clamp 350 or other securing mechanism.

Figure 4B:
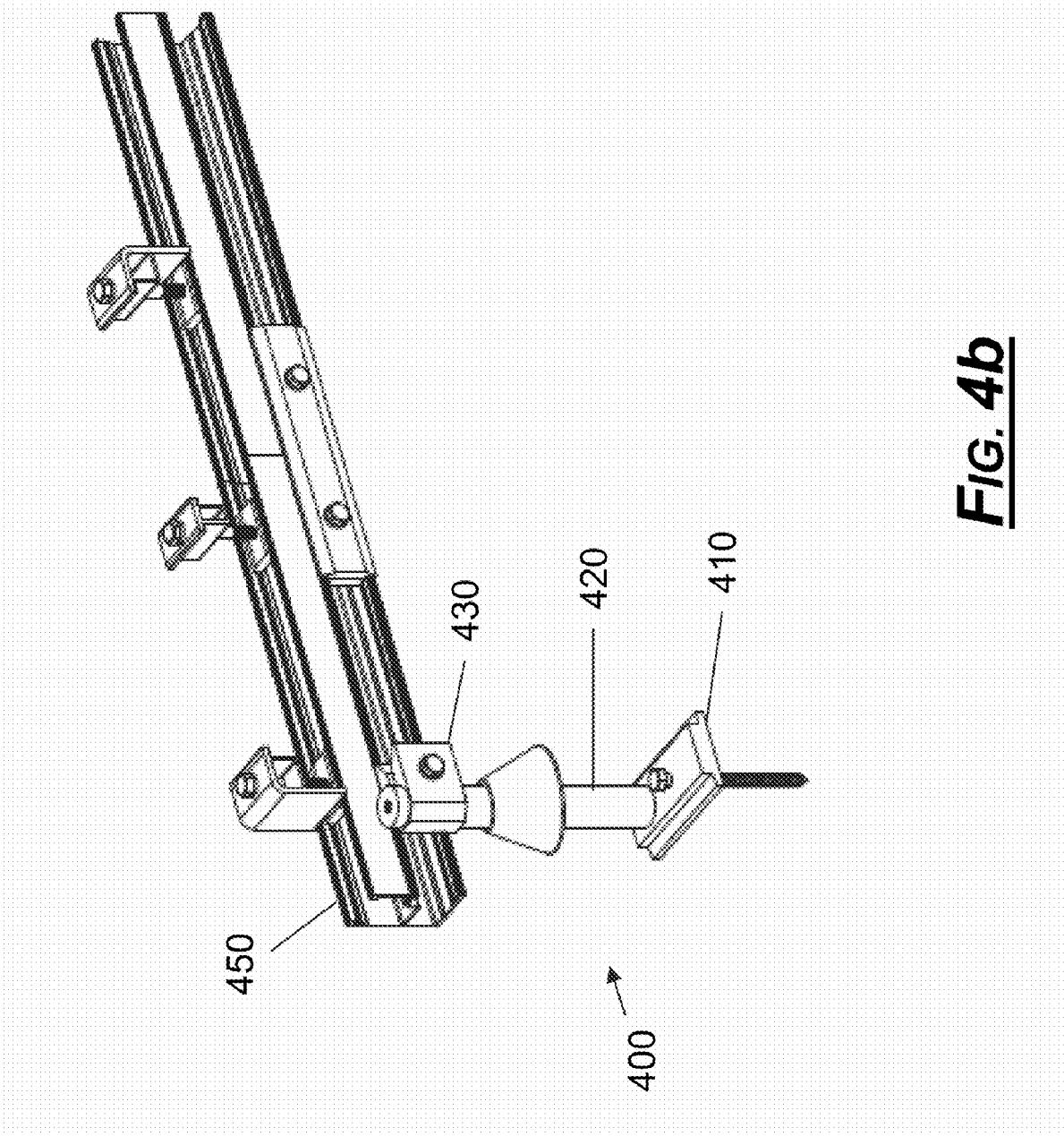
FIG. 4b shows a perspective view of a post clamp according to an exemplary embodiment.

An adjustable clamp assembly can be used to adjust the height of a rail or module secured to a roof or other surface. Referring to FIGS. 4a and 4b, an assembled post clamp 400 is shown. The post clamp 400 can be used with all roof types. As shown in FIGS. 4a and 4b, a post is used. Alternatively, in FIGS. 6a to 6d, an adjustable L-foot assembly is mounted to a roof.

The post clamp 400 includes a standoff base 410, a post 420, and a clamp 430. The standoff base 410 can be secured to a roof or other surface using a lag bolt 405 and a washer (not shown). Alternatively, the standoff base 410 can be secured using nails, epoxy, or other known methods. The standoff base 410 can be made of a durable weather resistant material, such as aluminum or stainless steel. A bolt 415 and a lock washer 425 can secure the post 420 to the standoff base 410.

The post 430, as shown in this exemplary embodiment, is a cylindrical member, but can have any polygonal shape, including rectangular or hexagonal. The post 430 can be composed of any rigid weather resistant material, such as aluminum, steel, fiberglass, or any other material known and/or convenient. The post 430 can have apertures at each end for attachment to the standoff base 410 or other component.

Figure 4C:
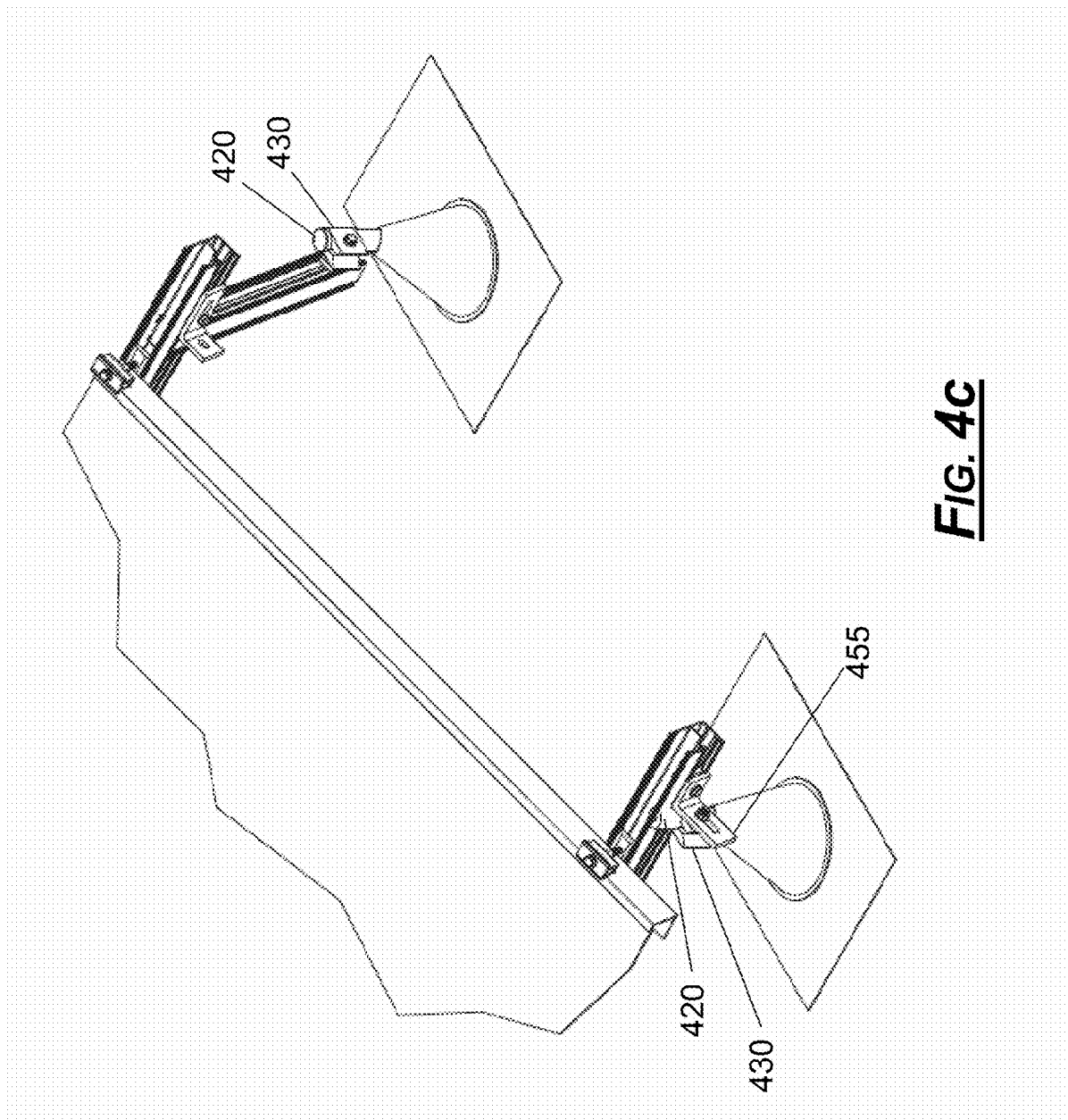
FIG. 4c shows a perspective view of a post clamp according to an alternative exemplary embodiment.

The clamp 430 can be removably attached to the post 420 to enable a height adjustment of a module or rail, as well as easy installation and removal of the clamp 430 from the post 420. The clamp 430 has an aperture 430a for receiving the post 420. The clamp 430 also has a first flange 430b and an opposing second flange 430c which are separated by a void that abuts the aperture 430a. The first and second flanges 430b, 430c taper away from the aperture 430a. The clamp 430 has an aperture 430d for receiving a bolt 435 thread through a washer 440. The bolt 435 extends through the first flange 430b and the second flange 430c to a module or rail, shown here as a channel nut 445 used to secure a rail 450. The bolt 435 can also secure the clamp 430 to an L-foot 455, module, rail, or other component, as shown in a steep tilt configuration depicted in FIG. 4c. As the bolt 435 is actuated and enters the aperture 430d, the first flange 430b and the second flange 430c move toward each other to tighten the clamp 430 on the post 420. The clamp 430 can remain in position on the post 420 because of the pressure exerted by the tightened clamp 430 and the resulting friction that must be overcome to move the clamp 430. In order to loosen the clamp 430 for adjustment or removal, the bolt 435 is rotated in a direction to disengage the aperture 430d. The clamp 430, which is attached to the rail 450, can be adjusted along post 420 to adjust the height of the rail 450. As shown in a shallow tilt configuration depicted in FIG. 4d, in order to tilt a module 460, clamp 430 on a first post 420a can be positioned higher than a clamp 430 on a second post 420b.

A clamp can adjust along a post at any varied height. If the post is not high enough, the post can be extended using at least one spacer. Referring to FIGS. 5a and 5b, a post 500 is secured to a standoff base 510 using a bolt 520. A clamp 530 secures a rail 540 to the post 500. As shown in FIG. 5a, the clamp 530 is at a first position (shown having a rail height at about 7.5 inches) along the post 500. As shown in FIG. 5b, the clamp 530 is at a second position (shown having a rail height at about 8.5 inches) along the post 500. The clamp 530 can be tightened at any point along the post 500 and is not limited to those positions shown in these exemplary embodiments.

At least one spacer can be added to the post to allow a further height adjustment and/or leveling on an uneven surface. As shown in FIG. 5c, one spacer 550 has been added to the top of the post 500. As a result, the clamp 530 can be adjusted to achieve a third position (shown having a rail height at about 9.5 inches) that, upon adding the spacer 550, can be adjusted from about 7.5 inches to about 9.5 inches. As shown in FIG. 5d, two spacers 550 have been added to the top of the post 500. As a result, the clamp 530 can be adjusted to achieve a fourth position (shown having a rail height at about 10.5 inches) that, upon adding the second spacer 550, can be adjusted from about 7.5 inches to about 10.5 inches. The spacer 550 acts as an extension of the post 500 and can take a similar form. For example, if the post 500 is a cylindrical member, the spacer 500 can also be a cylindrical member having the same diameter. The spacer 550 can attach to the post 500 or another spacer 550 using a set screw (not shown). The spacer 550 can be manufactured in a standard size, such as one inch, for easier calculations of height adjustments. The clamp 530 can be tightened at any point along the post 500 and is not limited to those positions shown in these exemplary embodiments.

A spacer can also be added to an L-foot support for added height and/or leveling on an uneven surface. FIG. 6a shows an L-foot 600 securing a rail 640 to a roof (not shown), wherein the L-foot 600 is attached to a base 610 and a flashing 620. The rail 640 is positioned with a rail height of about 3.33 inches.

Referring to FIG. 6b, the rail 640 can be adjusted along the L-foot 600 using an elongated aperture (shown as aperture 250d in FIG. 2a) in L-foot 600. The rail 640 can be positioned with a rail height of between about 3.33 and 4.33 inches.

Referring to FIG. 6c, a spacer 650 can be secured to the base 610 by a threaded stud 660 extending from the base 610. A set screw 670 can secure the L-foot 600 to the spacer 650. A nut 680 secures the L-foot 600 to the set screw 670. The rail 640 can be positioned with a rail height of between about 4.33 and 5.33 inches.

Referring to FIG. 6d, a first spacer 650a can be secured to the base 610 by threaded stud 660. A second spacer 650b can be secured to the first spacer 650a and L-foot 600 can be secured to the second spacer 650b by set screw 660. Nut 680 secures the L-foot 600 to the set screw 670. Additional spacers can also be included between first spacer 650a and second spacer 650b. The rail 640 can be positioned with a rail height of between about 5.33 inches and 6.33 inches.

The embodiments described above are intended to be exemplary. One skilled in the art recognizes that numerous alternative components and embodiments that may be substituted for the particular examples described herein and still fall within the scope of the invention.

What is claimed is:

1. An assembly for securing a component, the assembly comprising:
   a rail comprising:
      a first component comprising:
         a first rail flange at a distal end of the first component;
         a first recess proximal to the first rail flange; and
         a first bump proximal to the first recess; and
      a second component comprising:
         a second rail flange at a distal end of the second component;
         a second recess proximal to the second rail flange; and
         a second bump proximal to the second recess, and wherein the second component opposes the first component; and
   a first nut comprising:
      a first aperture for receiving a first bolt;
      a first nut flange configured to engage the first recess on the first component of the rail; and
      a second nut flange configured to engage the second recess on the second component of the rail, wherein the first and second nut flanges are configured to snap securely into the first and second recesses through orienting the first nut at a first angle, engaging the first nut flange past the first bump into the first recess, and snapping the second nut flange past the second bump into the second recess.

2. The assembly according to claim 1, wherein when the first nut is being installed, the first nut is configured to be oriented perpendicular to the direction of insertion after the first nut has been inserted at the first angle.

3. The assembly according to claim 1, wherein the first nut comprises a first nut recess proximal to the first nut flange configured to engage the first rail flange, and the second nut comprises a second nut recess proximal to the second nut flange configured to engage the second rail flange.

4. The assembly of claim 1, further comprising the first bolt threaded through the first aperture.

5. The assembly of claim 1, wherein the rail is engaged to the first nut, and wherein the first bolt is threaded through the first aperture of the first nut.

6. The assembly of claim 5, wherein the rail further comprises:
   a third component comprising:
      a third rail flange at a distal end of the third component;
      a third recess proximal to the third rail flange; and
      a third bump proximal to the third recess; and
   a fourth component comprising:
      a fourth rail flange at a distal end of the fourth component;
      a fourth recess proximal to the fourth rail flange; and
      a fourth bump proximal to the fourth recess, and wherein the fourth component opposes the third component.

7. The assembly of claim 6, further comprising one of a cable and a wire running inside the rail.

8. The assembly of claim 1, wherein the component is a photovoltaic solar panel.

9. The assembly of claim 6, further comprising a second nut, the second nut comprising:
   a second aperture for receiving a second bolt;
   a third nut flange configured to engage the third recess on the third component of the rail; and
   a fourth nut flange configured to engage the fourth recess on the fourth component of the rail, wherein the third and fourth nut flanges are configured to snap securely into the third and fourth recesses through orienting the second nut at a second angle, engaging the third nut flange past the third bump into the third recess, and snapping the fourth nut flange past the fourth bump into the fourth recess.

10. The assembly of claim 9, wherein the rail further comprises:
    a fifth component extending perpendicularly from the first component towards the second component; and
    a sixth component extending perpendicularly from the fifth component to a proximal end of the fourth component, wherein:
       the third component extends perpendicularly from a proximal end of the first component; and
       a side of the distal end of the fourth component opposite the fourth rail flange is coupled to a proximal end of the second component.

11. The assembly of claim 9, wherein the rail further comprises a fifth component, and wherein:
    a proximal end of the third component is coupled to a proximal end of the first component;
    a proximal end of the fourth component is coupled to a proximal end of the second component;
    the fifth component extends perpendicularly from the proximal ends of the first and third components to the proximal ends of the second and fourth components;
    the third component is aligned with the first component; and
    the fourth component is aligned with the second component.

* * * * *